(12) United States Patent
Parks et al.

(10) Patent No.: US 12,443,615 B2
(45) Date of Patent: Oct. 14, 2025

(54) OPERATIONALIZING METADATA

(71) Applicant: Ab Initio Technology LLC, Lexington, MA (US)

(72) Inventors: Robert Parks, Weston, MA (US); Jonah Egenolf, Winchester, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 18/104,066

(22) Filed: Jan. 31, 2023

(65) Prior Publication Data
US 2024/0070163 A1     Feb. 29, 2024

Related U.S. Application Data

(60) Provisional application No. 63/400,333, filed on Aug. 23, 2022.

(51) Int. Cl.
    *G06F 16/25*      (2019.01)
    *G06F 16/22*      (2019.01)
    (Continued)

(52) U.S. Cl.
    CPC .......... *G06F 16/254* (2019.01); *G06F 16/26* (2019.01); *G06F 16/9024* (2019.01)

(58) Field of Classification Search
    CPC ........ G06F 8/433; G06F 16/254; G06F 16/26; G06F 16/9024; G06F 16/2228
See application file for complete search history.

(56) References Cited

U.S. PATENT DOCUMENTS 5,966,072 A  * 10/1999 Stanfill ................ G06F 9/5038
                                                      340/440
9,977,659 B2 *   5/2018 Larson ...................... G06F 8/34
(Continued)

FOREIGN PATENT DOCUMENTS

CN      112534401 A  *   3/2021  ......... G06F 16/2379
EP        3803570 B1  *   8/2023  ......... G06F 16/2379
(Continued)

OTHER PUBLICATIONS

Community.talend.com [online], "Metadata driven Ingestion and Curate Framework in Talend," Sep. 15, 2020, retrieved on Jul. 23, 2021, retrieved from URL<https://community.talend.com/s/article/Metadata-driven-Ingestion-and-Curate-Framework-in-Talend?language-en_US>, 10 pages.

(Continued)

*Primary Examiner* — Dennis Truong
(74) *Attorney, Agent, or Firm* — Fish & Richardson P.C.

(57) ABSTRACT

A method for using a metadata model to perform operations on data items, with the metadata model including parent nodes and child nodes connected by edges, with the parent nodes specifying logical metadata and the child nodes specifying physical metadata representing the data items, and with the edges specifying relationships between the nodes. The method includes: identifying a given data item and physical metadata of that given data item, accessing the metadata model, identifying, in the metadata model, a child node representing the physical metadata of the given data item, traversing one or more edges in the metadata model to identify parent nodes of the child node, determining, from logical metadata associated with the identified parent nodes, one or more operations to be performed on the given data item, applying the one or more operations to the given data (Continued)

item to transform the data item, and storing the transformed data item.

35 Claims, 18 Drawing Sheets

(51) Int. Cl.
*G06F 16/26* (2019.01)
*G06F 16/901* (2019.01)

(56) References Cited

U.S. PATENT DOCUMENTS

| | | | | |
|---|---|---|---|---|
| 10,303,690 | B1* | 5/2019 | Todd | G06F 16/2457 |
| 10,521,442 | B1* | 12/2019 | Gatchell | G06F 16/2474 |
| 10,671,669 | B2* | 6/2020 | Abaya | G06F 8/433 |
| 11,494,381 | B1* | 11/2022 | Champlin | G06F 3/14 |
| 2007/0130180 | A1* | 6/2007 | Rasmussen | G06F 16/25 |
| 2012/0215749 | A1* | 8/2012 | Van Beneden | G06Q 10/10 |
| | | | | 707/694 |
| 2015/0019576 | A1* | 1/2015 | Seneski | G06F 40/149 |
| | | | | 707/755 |
| 2015/0160926 | A1* | 6/2015 | Larson | G06F 8/34 |
| | | | | 717/100 |
| 2015/0379299 | A1* | 12/2015 | Klein | G06F 21/6245 |
| | | | | 713/193 |
| 2016/0092818 | A1* | 3/2016 | Kamath | G06Q 10/06316 |
| | | | | 705/7.26 |
| 2016/0306827 | A1* | 10/2016 | Dos Santos | G06F 16/25 |
| 2017/0308715 | A1* | 10/2017 | Drost-Hansen | G06F 21/6245 |
| 2018/0032550 | A1* | 2/2018 | Gupta | G06F 16/2282 |
| 2018/0189316 | A1* | 7/2018 | Mazukabzov | G06F 16/2379 |
| 2018/0253477 | A1* | 9/2018 | Schoueri | G06F 16/10 |
| 2019/0065765 | A1* | 2/2019 | Peterson | H04L 63/105 |
| 2019/0287032 | A1* | 9/2019 | Seabolt | G06Q 50/265 |
| 2019/0303509 | A1 | 10/2019 | Greene | |
| 2020/0019558 | A1* | 1/2020 | Okorafor | G06F 21/6254 |
| 2020/0250199 | A1* | 8/2020 | Patton | G06F 16/2457 |
| 2021/0133324 | A1* | 5/2021 | Chari | G06F 21/566 |
| 2022/0043826 | A1* | 2/2022 | Zorin | G06F 16/24573 |
| 2023/0100418 | A1* | 3/2023 | Radivojevic | G06F 16/254 |
| | | | | 711/154 |
| 2023/0259521 | A1* | 8/2023 | Haelen | G06F 16/254 |
| | | | | 707/602 |

FOREIGN PATENT DOCUMENTS

| | | | | |
|---|---|---|---|---|
| WO | WO-2014209260 | A1 * | 12/2014 | G06F 16/2372 |
| WO | WO-2019231793 | A1 * | 12/2019 | G06F 16/2379 |

OTHER PUBLICATIONS

Lean-Data.nl [online], "5 Steps to begin collecting the value of your data," retrieved on Jul. 23, 2021, retrieved from URL<https://www.lean-data.nl/general/5-steps-to-begin-collecting-the-value-of-your-data/>, 8 pages.
U.S. Appl. No. 12/945,094, filed Nov. 12, 2010, Parmenter et al.
U.S. Appl. No. 16/794,361, filed Feb. 19, 2020, Butler et al.
International Search Report and Written Opinion in International Appln. No. PCT/US2023/029810, mailed on Oct. 17, 2023, 16 pages.

* cited by examiner

OPERATIONALIZING METADATA

PRIORITY

This application claims priority to and the benefit of U.S. Provisional Patent Application No. 63/400,333, filed Aug. 23, 2022, the entire content of which is incorporated herein by reference.

TECHNICAL FIELD

This disclosure relates to techniques for making metadata operational within a data enterprise.

BACKGROUND

Organizations maintain increasingly large and complex collections of data in order to carry out their business. In many cases, an organization's data is stored in a way that facilitates efficient use of computing resources rather than human understanding. As a result, it can be difficult for a user to understand what data an organization has, or how to access the data for use in various tasks. Even when a user is able to identify a piece of relevant data, it can be difficult and time consuming to generate code to perform desired operation on the data, especially for non-technical users. In addition, changes to an organizations data can break or otherwise render existing data processing operations obsolete.

SUMMARY

In general, in a first aspect, a method implemented by a metadata management system uses a metadata model to identify and perform one or more operations on one or more data items, with the metadata model including one or more parent nodes and one or more child nodes, with the one or more operations being defined with respect to one or more parent nodes in the metadata model and applied to data represented by one or more child nodes in the metadata model, with the one or more parent nodes specifying logical metadata and with the one or more child nodes specifying physical metadata representing the one or more data items. The method includes: identifying a given data item and physical metadata of that given data item; accessing, by the metadata management system, the metadata model, in which edges connect the nodes, with an edge specifying a relationship between two nodes; identifying, in the metadata model, a child node representing the physical metadata of the given data item; traversing one or more edges in the metadata model to identify one or more parent nodes of the child node; determining, from metadata associated with the one or more parent nodes identified, one or more operations to be performed on the given data item; applying, by the metadata management system, the one or more operations to the given data item to transform the given data item; and storing, in memory, the transformed data item.

In general, in a second aspect combinable with the first aspect, identifying the child node representing the physical metadata of the given data item includes matching the physical metadata of the given data item to physical metadata represented by the child node in the metadata model.

In general, in a third aspect combinable with the first and second aspects, the method further includes accessing one or more metadata transforms to determine the one or more operations to be performed on the given data item, each metadata transform specifying at least one operation to be performed on data and at least one condition for performing the at least one operation.

In general, in a fourth aspect combinable with any of the first through third aspects, determining the one or more operations to be performed on the given data item includes: selecting a metadata transform from the one or more metadata transforms; determining whether the logical metadata associated with the one or more parent nodes satisfies the at least one condition of the selected metadata transform; and in response to determining that the logical metadata associated with the one or more parent nodes satisfies the at least one condition of the selected metadata transform, determining that the one or more operations to be performed on the given data item includes the at least one operation specified by the selected metadata transform.

In general, in a fifth aspect combinable with any of the first through fourth aspects, identifying the given item of data includes identifying the given item of data that is accessed according to a processing specification, and applying the one or more operations to the given item of data includes inserting the one or more operations into the processing specification, and executing the processing specification to apply the one or more operations to the given item of data.

In general, in a sixth aspect combinable with any of the first through fifth aspects, the processing specification includes a specification for a dataflow graph, and applying the one or more operations to the given item of data includes executing the dataflow graph, with executing the dataflow graph applying the one or more operations to the given item of data.

In general, in a seventh aspect combinable with any of the first through sixth aspects, the method further includes updating the metadata model based on the transformed data item.

In general, in an eighth aspect combinable with any of the first through seventh aspects, updating the metadata model includes adding one or more nodes to the metadata model, the added one or more nodes representing metadata for the transformed data item.

In general, in a ninth aspect combinable with any of the first through eighth aspects, updating the metadata model includes adding one or more edges to existing nodes in the metadata model to connect the existing nodes in the metadata model to the added nodes.

In general, in a tenth aspect, combinable with any of the first through ninth aspects, some of the added nodes are replications of some of the nodes that were already existing in the metadata model before the updating.

In general, in an eleventh aspect, combinable with any of the first through tenth aspects, the updated metadata model is output for further processing of a data item.

In general, in a twelfth aspect combinable with any of the first through eleventh aspects, the method further includes: identifying physical metadata of the transformed data item; identifying, in the updated metadata model, a child node representing the physical metadata of the transformed data item; traversing one or more edges in the updated metadata model to identify one or more parent nodes of the child node that represents the physical metadata of the transformed data item; and determining, from logical metadata associated with the one or more parent nodes identified by traversing the one or more edges in the updated metadata model, that the one or more operations performed on the given data item are not to be performed on the transformed data item.

In general, in a thirteenth aspect combinable with any of the first through twelfth aspects, determining that the one or more operations performed on the given data item are not to be performed on the transformed data item includes determining that the logical metadata associated with the one or more parent nodes identified by traversing the one or more edges in the updated metadata model is different from the logical metadata associated with the one or more parent nodes identified by traversing the one or more edges in the metadata model.

In general, in a fourteenth aspect combinable with any of the first through thirteenth aspects, the method further includes: identifying physical metadata of the transformed data item; identifying, in the updated metadata model, a child node representing the physical metadata of the transformed data item; traversing one or more edges in the updated metadata model to identify one or more parent nodes of the child node that represents the physical metadata of the transformed data item; determining, from logical metadata associated with the one or more parent nodes identified by traversing the one or more edges in the updated metadata model, one or more second operations to be performed on the transformed data item; applying, by the metadata management system, the one or more second operations to the transformed data item to further transform the transformed data item; and storing, in memory, the further transformed data item.

In general, in a fifteenth aspect combinable with any of the first through fourteenth aspects, applying the one or more operations to the given data item includes dropping a data field associated with the data item from further processing by a computer program.

In general, in a sixteenth aspect combinable with any of the first through fifteenth aspects, applying the one or more operations to the given data item includes adding a data field to the data item or a dataset associated with the data item.

In general, in a seventeenth aspect combinable with any of the first through sixteenth aspects, applying the one or more operations to the given data item includes filtering a data record associated with the data item.

In general, in an eighteenth aspect combinable with any of the first through seventeenth aspects, the one or more operations to be performed on the given data item include a tokenization operation, and the applying of the one or more operations to the given data item to transform the given data item includes applying the tokenization operation to the given data item to tokenize one or more fields of the given data item.

In general, in a nineteenth aspect combinable with any of the first through eighteenth aspects, the logical metadata associated with the one or more parent nodes includes metadata received from a user by interaction with the metadata management system.

In general, in a twentieth aspect combinable with any of the first through nineteenth aspects, the metadata received from the user is a personally identifiable information (PII) specification that was specified by the user through a graphical user interface, said graphical user interface including a visualization of the metadata model, and the PII classification was specified by an interaction of the user with the visualization of the metadata model to select an item of metadata associated with one or more of the parent nodes for which the PII specification is to be specified in the model, and the method further includes: updating the model after receiving of the PII specification to associate the logical metadata with the one or more parent nodes, including indicating in the model that the one or more of the parent nodes associated with the selected item of metadata are associated with the PII specification, in which the one or more operations applied to the given data item to transform the given data item includes tokenizing one or more fields of the given data item.

In general, in a twenty-first aspect, combinable with any of the first through twentieth aspects, accessing a plurality of data items stored in hardware storage; for each data item of the plurality of data items, identifying physical metadata and logical metadata corresponding to the data item; generating the metadata model based on the physical metadata and the logical metadata identified for each of the plurality of data items; providing access to the metadata model for a first application and a second application; accessing, by at least one of the first application or the second application, the metadata model, in which each of the first application and the second application are configured to: access the given data item to identify the physical metadata of that given data item; identify, in the metadata model, the child node presenting the identified physical metadata of the given data item; traverse one or more edges in the metadata model to identify the one or more parent nodes of the identified child node; determine, from the logical metadata associated with the one or more parent nodes identified, at least one operation to be performed on the given data item; apply the at least one operation to the given data item to transform the given data item; and store the transformed data item.

In general, in a twenty-second aspect, combinable with any of the first through twenty-first aspects, the metadata model includes a first data structure corresponding to the parent nodes, the data structure including the logical metadata and at least a first pointer and a second pointer, in which the first pointer points to a second data structure corresponding to the child node that represents the physical metadata of the given data item, and the second pointer points to a third data structure corresponding to another child node that represents physical metadata of another data item different from the given data item.

In general, in a twenty-third aspect, a system includes at least one processor and memory storing instructions executable by the at least one processor to perform the operations of any of the first through twenty-second aspects.

In general, in a twenty-fourth aspect, a non-transitory computer readable medium stores instructions executable by at least one processor to perform the operations of any of the first through twenty-second aspects.

Aspects can include one or more of the following advantages.

By using metadata to automate the identification of operations and their application on data, the operations can automatically be applied across multiple items of data within a data enterprise without the need for a user to define the operations on a data item by data item basis. Not only does this improve the efficiency with which vast amounts of continuously changing data are processed (e.g., because the operations need not be defined for each individual data item), but this also enhances the robustness and integrity of data policies (e.g., data security policies, data governance policies, data quality policies, etc.), because the operations can automatically adapt to account for changes in the underlying data, including the addition of new data. Also, the incorporation of new operations, such as to account for new types of data or new data policies, is facilitated.

The techniques described herein also provide for more efficient processing of data with reduced memory. Prior systems have stored metadata in a read-only format, which has been a source of major latency and inefficiency. This is because the metadata has only been used by analysts to learn about data, but they then manually take that information and utilize it in different projects as needed. Rather than the metadata being read only, the techniques described use the metadata is the initial starting point in a connected chain for operationalizing that metadata using other applications to define the necessary processing for chosen data (e.g., datasets) and then execute that processing. For example, the metadata management system can be connected to one or more other systems, such as a first system for writing dataflow graphs (and/or other computer programs) that define data processing operations, and a second system that is a data governance system. Under the old systems, a user could view the metadata of various datasets. But, if the user wanted to access that data—e.g., for defining the processing to be done in the first system and/or controlling the processing to be done by the second system, the data would have to be accessed and imported twice (once into each system) in order to access the metadata that—in turn—is used in defining the data processing operations in the first system and specifying the control operations in the second system. Now, rather than accessing the data multiple times—once for each application that is requiring the metadata to define the processing, controlling, etc., each datasets only needs to be accessed once, thereby reducing time and resources needed for accessing data sets. The metadata is identified and provided with semantic meaning. The metadata model is then generated and is continuously updated as additional metadata is created. The data processing system makes the metadata in the metadata model accessible to each of the applications or systems, thus resulting in a system in which the metadata for a dataset only needs to be read once and semantic discovery only needs to be performed on that read metadata (or data corresponding to that read metadata) once for use in multiple applications or systems. The single reading and accessing and processing (via semantic discovery) of the metadata results in a metadata model that is continuously updated with new metadata (e.g., by new nodes being added to the metadata model) and that is made accessible to various systems and applications for use in defining processing.

According to preferred aspects, a user can specify operations to be performed on data within the data enterprise without the need to define (e.g., code) the means for accessing the data or performing the operations. For example, a user (e.g., a non-technical user) can specify that a particular item of logical metadata (e.g., SSN) is a form of personally identifiable information (PII) without knowing which item(s) of physical data within the enterprise correspond to SSN, or how to access those item(s) of data. Based on this metadata definition, the items of data that correspond to SSN are automatically identified by the system (e.g., by traversing the metadata model) and processed to obfuscate the data (e.g., by performing or inserting into a computer program operations that mask or tokenize the data) without the user having to generate code to perform these operations.

According to preferred aspects, metadata produced as a result of the application of the operations to the data is propagated or replicated to the metadata model to reduce further consumption of computing resources during subsequent processing based on the metadata model. That is, the techniques described herein provide for increased efficiency in processing data. This is because the metadata model is continuously updated with results of prior processing. For example, if a new data item is produced as a result of an operation (e.g., tokenized SSN data is produced as a result of a tokenization operation), then the system can update the metadata model to include metadata for the new data item. That is, nodes and edges are added to the metadata model—with the added nodes and edges representing the tokenized SSN data (e.g., the meaning of the tokenized data, the relationships among the tokenized data and other data or metadata, the storage location and other access parameters for the tokenized data, etc.). As such, if the data processing system needs that tokenized data at a later point in time, the data processing system does not need to re-tokenize the original data. Rather, the data processing system uses the metadata model to identify and access the tokenized SSN data. This saving of the metadata representing the tokenized SSN data in the metadata model conserves computing resources because the data processing system can simply look up the tokenized data, rather than having to re-compute it based on the original data.

Previously discovered or generated metadata can also be propagated or replicated to the new data item. That is, new edges can be added to the metadata model to associate node(s) representing the new data item with existing nodes in the model. For example, if a particular data item is associated with PII such as SSN in the metadata model, and a new data item is created based on that particular data item (e.g., due to a duplication operation), then the system can automatically propagate the SSN association to the new data item in the metadata model (e.g., by adding an edge between the SSN node and a node representing the new data item). As such, if the system accesses the new data item at a later point in time, then the system will know that the new data item is associated with SSN and, if necessary, perform appropriate data quality and/or data security operations based on the association. By updating the metadata model in this way, the system leverages existing work, such as work done to discover or generate metadata, in order to reduce the amount of computing resources (e.g., memory, processing cycles, etc.) needed to perform subsequent operations on data. In addition, propagating metadata in the metadata model ensures that data policies (e.g., data security policies, data governance policies, data quality policies, etc.) are adhered to as data changes are created within the system.

The details of one or more implementations are set forth in the accompanying drawings and the description below. Other features, objects, and advantages of the technology described here will be apparent from the description and drawings, and from the claims.

DETAILED DESCRIPTION

Figure 1:
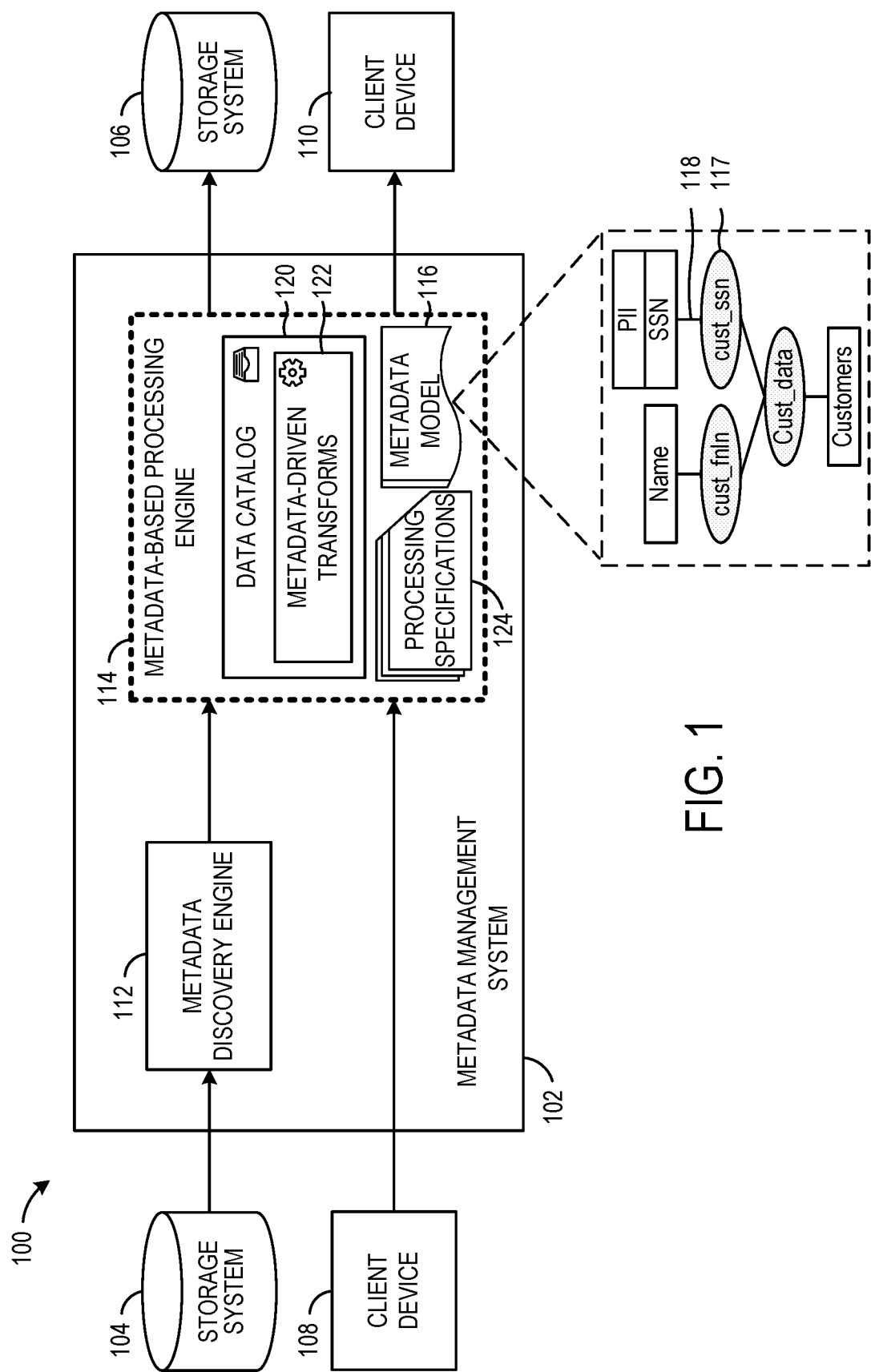
FIG. 1 illustrates an example of a metadata management system.

The present disclosure relates to the use of metadata to automate identification of operations and their application on data within a data enterprise. In some examples, a data processing system (sometimes referred to as a metadata management system) uses metadata for data stored within the data enterprise to generate a metadata model. The system can further enrich the metadata model with metadata specified by a user. When data within the data enterprise is accessed, the system uses the metadata model to automatically identify and apply operations to the data. In this manner, a user can specify operations to be performed on data within the enterprise without the need to understand the technical details of the enterprise or generate code to perform the operations. In addition, because the operations are defined at the metadata level, they can automatically be applied across multiple items of data accessed or otherwise processed by multiple different applications, rather than requiring a user to define the operations on a data item by data item basis in each application. Defining operations at the metadata level also enables the system to automatically adapt to changes in the underlying data, including the addition of new data. In some examples, the metadata model is updated as a result of the operations to improve the efficiency of subsequent data processing.

In general, the metadata management system can perform various processes to obtain metadata for data stored on one or more data sources within the data enterprise. For example, the system can discover physical metadata that describes attributes of the data (e.g., within which system data resides, the schema, table, field names, data type, data format, etc.) and relationships among the data (e.g., primary-foreign key relationships, entity relationships, etc.). The data processing system can also generate logical metadata based on the content of the stored data (or a selected subset of the stored data). Logical metadata provides details on how data is linked together to form larger sets. It also outlines how data flows through systems and processes, from creation, to storage, transformation, and consumption. Logical metadata can establish a roadmap on data's path through the data supply chain including its usage and alterations over time. For example, the system can determine that the stored data includes a dataset that relates to information about customers, and that the dataset contains a data field that holds a social security number (SSN) for each customer.

Using the metadata, the system generates a metadata model that describes physical and logical relationships and other attributes of the stored data. In general, the metadata model can include nodes representing items of physical and logical metadata, with edges representing relationships between the nodes. The system can enrich the metadata model with metadata specified by a user (sometimes referred to as user-specified metadata). For example, a user may specify that a SSN is a form of personally identifiable information (PII) that should be protected by the system. Based on this specification, the system can update the metadata model to indicate that the node representing SSN is associated with PII.

The system then uses the metadata model to automatically perform operations on data within the data enterprise. For example, when data item within the enterprise is accessed (e.g., by a computer program), the system identifies a node in the metadata model that corresponds to metadata (e.g., physical metadata) for the data item being accessed. The system can then traverse the metadata model to find other node(s) that are related to the identified node, as described in detail below. Based on metadata (e.g., logical metadata) associated with the related node, the system determines one or more operations to perform on the data item being accessed. For example, if the data item being accessed is related to the SSN node (which, as discussed above, has been tagged as PII), the system can determine to automatically insert into the computer program or otherwise perform an obfuscation or tokenization operation on the data item. This enhances data security. Also, the system can automatically perform operations (e.g., tokenization) on data items based on a high-level metadata specification by a user without requiring the user to identify the specific data items to be processed or generate code to perform operations. This improves the efficiency of data processing.

In some examples, the system may update the metadata model based on the operations performed on the data item. For example, if a new data item is produced as a result of the above-noted tokenization operation, the system can update the metadata model to include metadata for the new data item. In some examples, previously discovered or generated metadata can also be propagated to the new data item, as described in detail below. By updating the metadata mode in this way, the system leverages existing work to reduce the amount of computing resources (e.g., memory, processing cycles, etc.) needed to perform subsequent operations on the data.

Referring to FIG. 1, a system 100 for operationalizing metadata is shown. In this example, the system 100 includes a metadata management system 102, storage systems 104, 106, and client devices 108, 110. In general, the metadata management system 102 is a data processing system that uses metadata to automate identification of operations and their application on data stored, for example, in the storage system 104. After processing the data, the metadata management system 102 can store the data in the storage system 106, provide the data to the client device 110 for display, or both. Although shown as separate entities, in some examples the storage system 104 can be the same storage system as the storage system 106. Similarly, in some examples, the client device 108 can be the same client device as the client device 110.

The metadata management system 102 includes a metadata discovery engine 112 and a metadata-based processing engine 114. The metadata discovery engine 112 includes program instructions and/or executable logic to discover or otherwise obtain metadata for data stored in the storage system 104. For example, the metadata discovery engine 112 can perform discovery processes to obtain physical metadata that describes attributes of the data (e.g., field names, data type, data format, etc.) and relationships among the data (e.g., primary-foreign key relationships, entity relationships, etc.). In an example, data is prepared for processing by the metadata discovery engine 112 using format information. Data is received that includes records that have values for fields over an input device or port. A target record format for processing the data is determined. Multiple records are analyzed according to validation tests to determine whether the data matches candidate record formats. Each candidate record format specifies a format for each field, and each validation test corresponds to at least one candidate record format. In response to receiving results of the validation tests, the target record format is associated with the data based on at least one of: a candidate record format for which at least a partial match was determined according to at least one validation test, a parsed record format selected according to a data type associated with the data, and a constructed record format generated from an analysis of data characteristics. Other examples of such discovery processes are described in U.S. patent application Ser. No. 12/945,094, titled "Managing record format information," the entire contents of which are incorporated herein by reference.

The metadata discovery engine 112 can also perform semantic discovery processes on the data (or a selected subset of the data) to generate logical metadata that represents a semantic meaning of the data, among other things. For example, the metadata discovery engine 112 can identify a field included in one or more datasets, with the field having an identifier. For that field, the metadata discovery engine 112 profiles data values of the field to generate a data profile, accesses a plurality of label proposal tests, and generates a set of label proposals by applying the plurality of label proposal tests to the data profile. The metadata discovery engine 112 then determines a similarity among the label proposals and selects a classification. The metadata discovery engine 112 identifies one of the label proposals as identifying the semantic meaning. The metadata discovery engine 112 stores the identifier of the field with the identified one of the label proposals that identifies the semantic meaning. Other examples of such semantic discovery are described in U.S. patent application Ser. No. 16/794,361, titled "Discovering a semantic meaning of data fields from profile data of the data fields," the entire contents of which are incorporated herein by reference.

The metadata discovery engine 112 passes the physical and logical metadata to the metadata-based processing engine 114, which uses the metadata to generate a metadata model 116 having a plurality of nodes 117 and edges 118 representing relationships between the nodes. The metadata-based processing engine 114 also enriches the metadata model 116 with user-defined metadata received from, for example, the client device 108. In some examples, the metadata model 116 can include a set of objects or data structures, with each object or data structure representing a node. Each object or data structure can include data elements representing the physical, logical, and/or user-defined metadata of a respective node, as well as pointers to other objects or data structures that represent other nodes that are connected to the respective node by an edge. In some examples, the metadata-based processing engine uses the metadata model and other data to generate a data catalog 120 for the data stored in the storage system 104 (or a selected subset of the stored data). The data catalog 120 can include one or more data objects containing metadata and other information that identifies data or groups of data stored in the storage system 104. A user can interact with the data catalog 120 to define properties of the objects or select objects for use in data processing, among other things. For example, a user can associate objects in the data catalog 120 with one or more metadata-driven transforms 122, as discussed below. As another example, a development environment (not shown) that is part of or in communication with the metadata management system 102 can include a user interface with a representation of the catalog 120, and the user can select an object from the catalog to use, for example, an input to a dataflow graph or other computer program. Techniques for generating, maintaining, and using a data catalog are described in U.S. Pat. No. 9,977,659, titled "Managing Data Set Objects," the entire contents of which are incorporated herein by reference.

The metadata-based processing engine 114 can also store or otherwise access a plurality of processing specifications 124. In general, the processing specifications 124 can define or include program instructions and/or executable logic for processing data stored in the storage system 104. In some examples, each of the processing specifications 124 can be or otherwise define a computer program, such as a dataflow graph. A dataflow graph can include a plurality of vertices representing computational processes, each vertex having an associated access method, and a plurality of links, each connecting at least two vertices to each other and representing a flow of data between the connected vertices. When executed, the a system executing the graph (e.g., the metadata management system 102 or another data processing system) can prepare the graph for execution by performing graph transformation steps until each vertex is in a runnable state, and each link is associated with at least one communication method compatible with the access methods of the vertices connected by the link; launch each link by creating, by means of the executing system, a combination of communication channels and/or data stores, as appropriate to the link's communication method; and launch each process by invoking execution of the process on the executing system. Additional details regarding the implementation of such graph-based computations are described in U.S. Pat. No. 5,966,072, titled "Executing Computations Expressed as Graphs," the entire content of which are incorporated herein by reference. The processing specifications 124 can define or include operations for accessing the data in the data catalog 120 (e.g., from the storage system 104) for any of a variety of reasons, such as to ingest the data into the storage system 106 or generate a view of the data for presentation on the client device 110. Regardless of the specific processes defined by the processing specifications 124, the metadata-based processing engine 104 can use the metadata model 116 to automatically perform operations (e.g., the metadata-driven transforms 122) on data accessed from the storage system 104, as described herein.

Figure 2A:
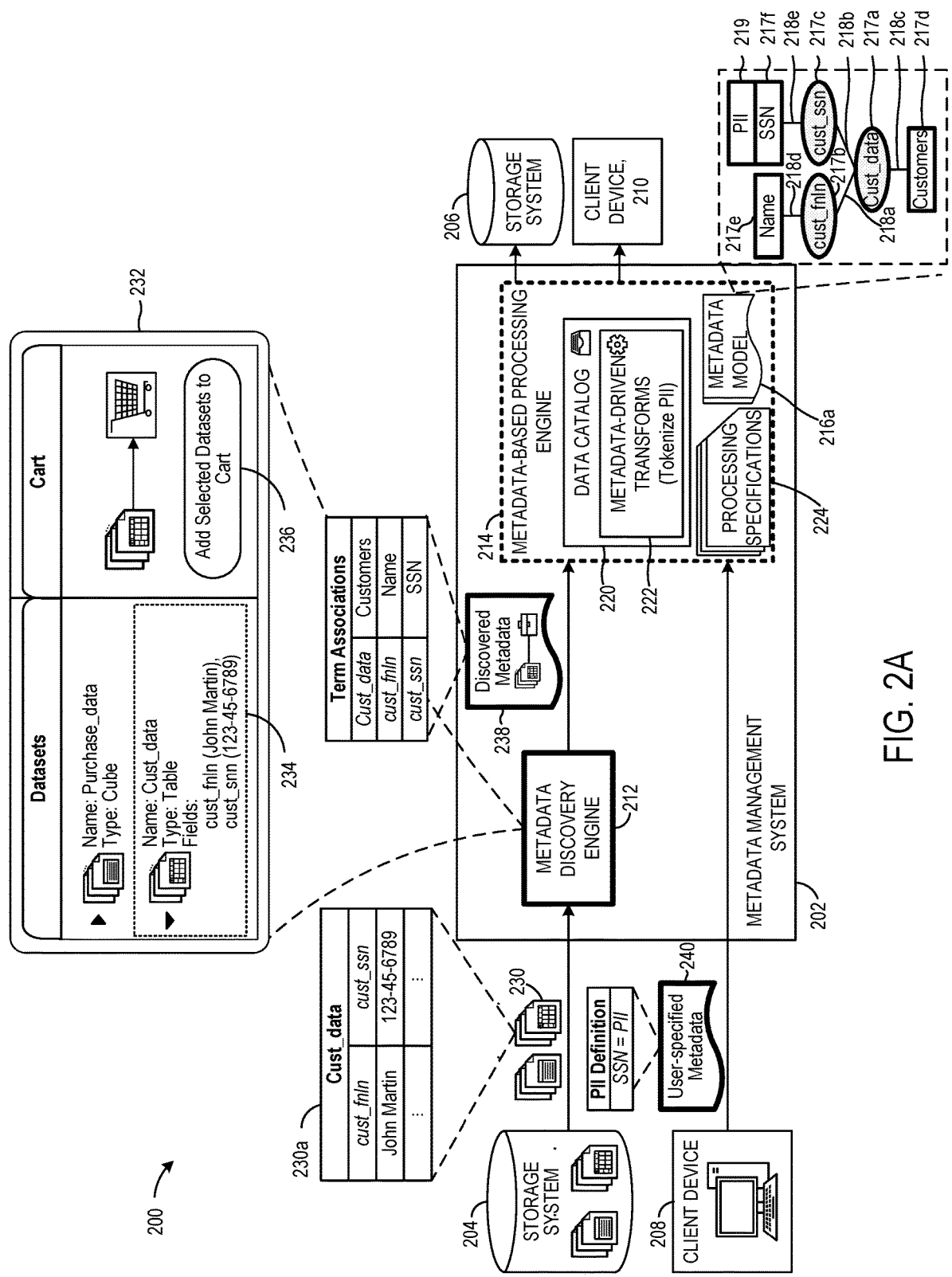
FIGS. 2A to 2B illustrate an example metadata management system configured to operationalize metadata.
Figure 2B:
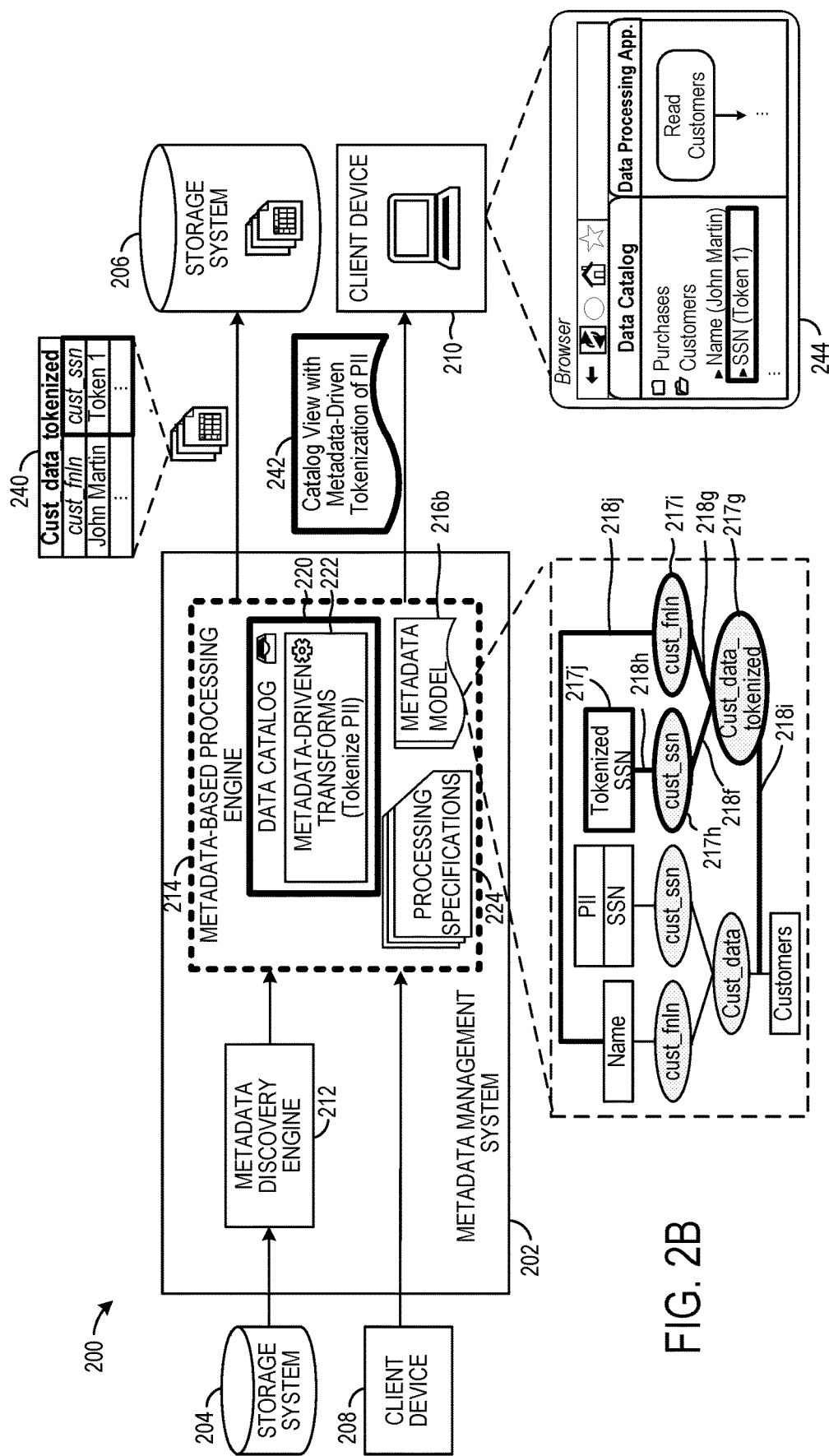

FIG. 2A and FIG. 2B illustrate a system 200 for operationalizing metadata, in accordance with an aspect of the present disclosure. Referring to FIG. 2A, the system 200 includes a metadata management system 202, storage systems 204, 206, and client devices 208, 210. Similar to the metadata management system 102 shown in FIG. 1, the metadata management system 202 includes a metadata discovery engine 212 and a metadata-based processing engine 214. In this example, the metadata discovery engine 212 receives datasets 230 stored in the storage system 204 and processes the datasets 230 to obtain corresponding metadata. In particular, the metadata discovery engine 212 determines that a dataset 230*a* includes the following items of physical metadata: a name "Cust_data," a type "Table," and fields "cust_fnln" and "cust_ssn."

A user can access the metadata management system 202 (e.g., via an application executing on the client device 208) to view and interact with a graphical user interface 232 that includes physical metadata for the datasets 230. Within the user interface 232, the user can select 234, based on the physical metadata, the datasets 230 to be added to a data cart 236. The metadata discovery engine 212 can then perform semantic discovery or other processes on the datasets 230 within the cart 236 to generate logical metadata that represents the semantic meaning of the datasets 230. For example, the metadata discovery engine 212 can determine that the dataset 230*a* includes information about customers, that the field "cust_fnln" includes a customer's name, and that the field "cust_ssn" includes a customer's SSN. In some examples, a user can approve the meanings associated with the dataset 230a and its fields and submit the datasets for entry into a data catalog 220 maintained by the system (not shown).

The metadata 238 discovered by the metadata discovery engine 212 is passed to the metadata-based processing engine 214. As noted above, the discovered metadata 238 can include the physical metadata and logical metadata (sometimes referred to as logical term associations) for the selected datasets 230. The metadata-based processing engine 214 uses the metadata 238 to generate a metadata model 216a for the datasets 230. In this example, the metadata model 216a includes oval-shaped nodes 217a, 217b, and 217c representing physical metadata for the dataset 230a, and rectangular-shaped nodes 217d, 217e, and 217f representing logical metadata for the dataset 230a. The metadata model 216a also includes edges 218a, 218b representing the physical relationship between dataset 230a (e.g., node 217a) and its fields (e.g., nodes 217b, 217c), edge 218c representing the logical relationship between the dataset 230a and its corresponding logical entity (e.g., logical dataset "Customers"), as well as edges 218d, 218e representing the logical relationships between each of the fields of the dataset 230a and their corresponding logical entities (e.g., logical data elements "Name" and "SSN").

The metadata-based processing engine 214 also receives user-specified metadata 240 from a user of the client device 210. In some examples, the metadata 240 can be specified with respect to an item of physical or logical metadata in the metadata model 216a. For instance, in this example, the user-specified metadata 240 indicates that the item of logical metadata representing SSN (e.g., the logical data element SSN) is associated with PII. Once received, the metadata-based processing engine 214 can incorporate the user-defined metadata 240 into the metadata model 216a. For example, the metadata-based processing engine 214 can update the metadata model 216a to indicate 219 that the node 217f representing SSN is associated with PII. Such an association can be made by, for example, including a metadata definition or other indicator with the SSN logical metadata, or by adding another node into the metadata model 216a that is linked to the node representing SSN by an edge, among others.

Referring to FIG. 2B, the metadata-based processing engine 214 can use the metadata model 216a to automatically perform operations on the datasets 230 stored in the storage system 204. In this example, a metadata-driven data transform 222 that is associated with data in the catalog 220 (including the datasets 230) specifies that data should be tokenized if it contains PII to enhance data security. Accordingly, when the metadata-based processing engine 214 executes the processing specifications 224, it will use the metadata model 216a (and the transforms 222) to determine whether some or all of a dataset 230 being accessed is associated with PII and, if so, perform a tokenization operation on that data. For instance, in this example, one of the processing specifications 224 specifies a data pipeline configured to ingest the dataset 230a into the storage system 206 (e.g., a data pipeline configured to read the dataset 230a from the storage system 104 and write the dataset to the storage system 106). Accordingly, the metadata-based processing engine 214 determines physical metadata for the dataset 230a, and identifies a node in the metadata model 216a that corresponds to the physical metadata for the dataset 230a. For example, the metadata-based processing engine 214 can determine that the dataset 230a has a name of "Cust_data," and can match this name to the node 217a in the metadata model 216a. The metadata-based processing engine 214 can then traverse the metadata model 216a to determine whether the dataset 230a contains PII. In this example, the metadata-based processing engine 214 determines that the field "cust_ssn" of the dataset 230a (represented by the node 217c) is associated with a logical data element SSN (represented by the node 217f), which has been defined as PII. Accordingly, the metadata-based processing engine 214 tokenizes the data in the "cust_ssn" field of the dataset 230a to create a "Cust_data_tokenized" dataset 242 for ingestion into the storage system 206.

In this example, another one of the processing specifications 224 specifies the operations configured to generate a catalog view of the dataset 230a for presentation to a user of the client device 210. The metadata-based processing engine 214 traverses the metadata model 216a as discussed above to determine that the field "cust_ssn" of the dataset 230a includes PII. As a result, the metadata-based processing engine 214 tokenizes the data in the "cust_ssn" field before sending the catalog view data 244 to the client device 210. Once received, the client device 210 can present the data 244 in a graphical user interface 246 that allows a user to view the tokenized data records for the dataset 230a, as well as use the tokenized data as a component in subsequent processing.

In some examples, the metadata-based processing engine 214 can update the metadata model 216a to produce a metadata model 216b that incorporates metadata for the newly-defined "cust_data_tokenized" dataset 242. For example, the metadata-based processing engine 214 can add nodes 217g, 217h, and 217i representing physical metadata for the dataset 242, and edges 218f, 218g representing relationships among the nodes 217g, 217h, and 217i. Since the "cust_ssn" field of the dataset 242 has been tokenized and no longer represents a SSN, the metadata-based processing engine 214 can also add a logical node 217j (e.g., "Tokenized SSN") that accurately describes the content of the tokenized field. An edge 218h can then be inserted to indicate the logical relationship between the nodes 217i and 217j. The metadata-based processing engine 214 can also replicate existing metadata in the metadata model 216b (see, e.g., nodes 217h, 217i) to populate the metadata for the new dataset 242. In particular, the metadata-based processing engine 214 can insert an edge 218i representing the logical relationship between the dataset 242 and its corresponding logical entity (e.g., logical dataset "Customers"), as well as an edge 218j representing the logical relationship between the "cust_fnln" field of the dataset 242 and its corresponding logical entity (e.g., logical data element "Name"). By updating the metadata model in this way, the computational resources needed for subsequent processing of the dataset 242 can be reduced because the model has already been populated with metadata for the dataset 242 (thereby obviating the need for metadata discovery on the dataset 242) while replicating some of the metadata 238 discovered for dataset 230, and because the model has been updated to reflect that the "cust_ssn" field of the dataset 242 has been tokenized (and thus need not be retokenized during subsequent processing).

Figure 3A:
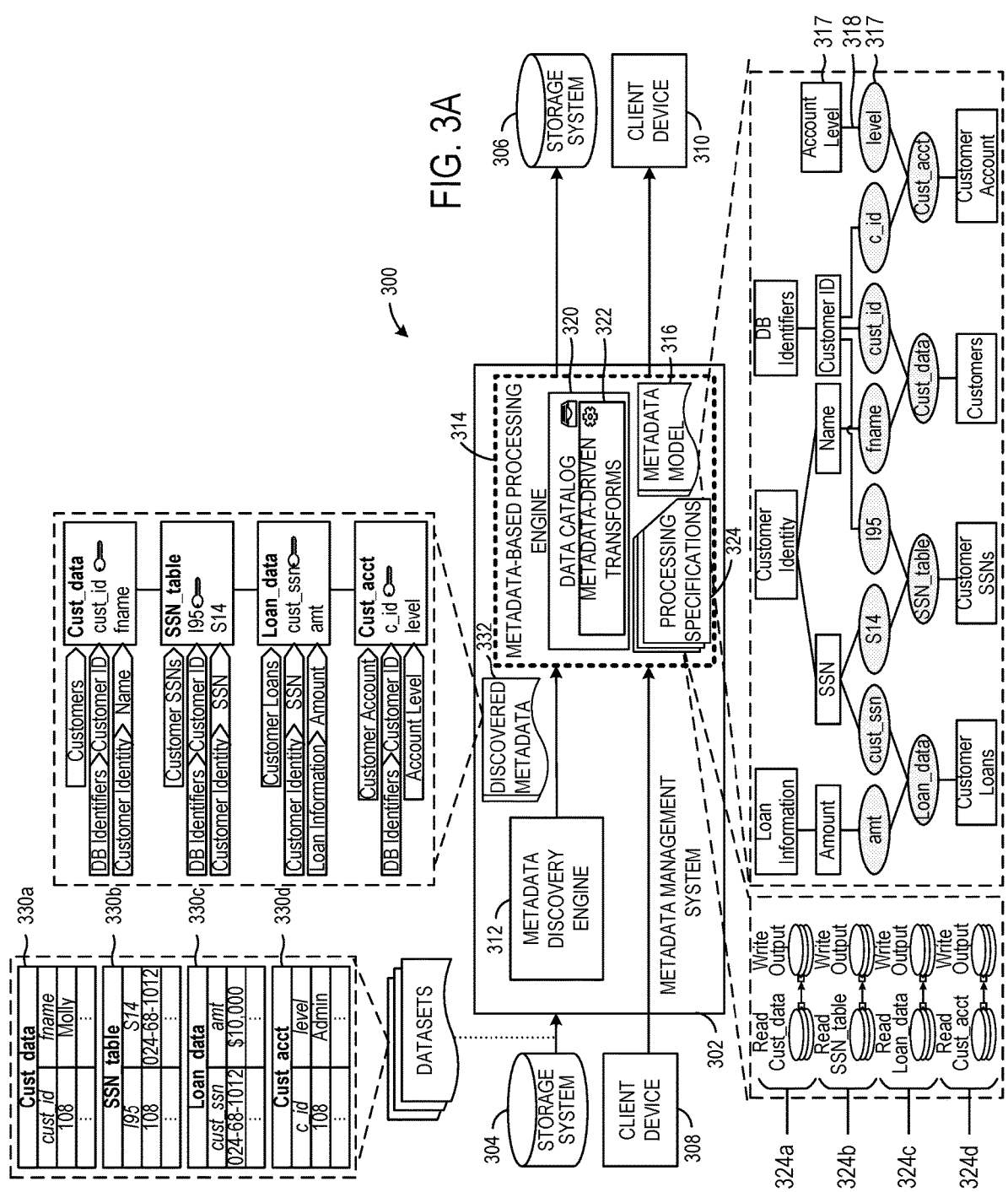
FIGS. 3A to 3D illustrate an example metadata management system configured to operationalize metadata.

FIG. 3A illustrates a system 300 for operationalizing metadata, in accordance with an aspect of the present disclosure. In this example, the system 300 includes a metadata management system 302, storage systems 304, 306, and client devices 308, 310. Similar to the metadata management systems 102 and 202, the metadata management system 302 includes a metadata discovery engine 312 and a metadata-based processing engine 314. In this example, the metadata discovery engine 312 receives datasets 330a-330d stored in the storage system 304 and processes the datasets 330a-330d to obtain corresponding physical and logical metadata 332. In particular, the metadata discovery engine 312 determines that the dataset 330a has a name "Cust_data" and includes fields "cust_id" (which serves as a primary key, as indicated by the key symbol) and "fname." The metadata discovery engine 312 also determines based on semantic analysis of the dataset 330a and its data that the dataset 330a "Cust_data" represents information about "Customers," that the field "cust_id" represents a "Customer ID," which is part of a broader group "DB Identifiers," and that the field "fname" represents a customer's "Name," which is part of a broader group "Customer Identity." The metadata discovery engine 312 also determines that the dataset 330a is related to the dataset 330b (e.g., through a primary-foreign key relationship), and that the dataset 330b has a name "SSN table" and includes fields "I95" and "S14." Based on semantic analysis of the dataset 330b and its data, the metadata discovery engine 312 determines that the dataset 330b represents "Customer SSNs," that the field "I95" represents a "Customer ID," which is part of the group "DB Identifiers," and that the field "S14" represents a customer's "SSN," which is part of the group "Customer Identity." The metadata discovery engine 312 also determines that the dataset 330b is related to the dataset 330c (e.g., through a primary-foreign key relationship), and that the dataset 330c has a name "Loan_data" and includes fields "cust_ssn" and "amt." Based on semantic analysis of the dataset 330c, the metadata discovery engine 312 determines that the dataset 330c represents "Customer Loans," that the field "cust_ssn" represents a customer's "SSN," which is part of the group "Customer Identity," and that the field "amt" represents an "Amount" within the group "Loan Information." The metadata discovery engine 312 determines that the dataset 330c is related to the dataset 330d (e.g., through a primary-foreign key relationship), and that the dataset 330d has a name "Cust_acct" and fields "c_id" and "level." The metadata discovery engine 312 also determines based on semantic analysis of the dataset 330d and its data that the dataset 330d represents information about a "Customer Account," that the field "c_id" represents a "Customer ID," which is part of the group "DB Identifiers," and that the field "level" represents a customer's "Account Level."

The metadata discovery engine 312 passes the discovered metadata 332 to the metadata-based processing engine 314. The metadata-based processing engine 314 uses the metadata 332 to generate a metadata model 316 that includes a plurality of nodes 317 and edges 318. In this example, oval-shaped nodes 317 represent items of physical metadata for the datasets 330a-330d, and rectangular-shaped nodes 317 represent items of logical metadata for the datasets 330a-330d. In some examples, the metadata-based processing engine 314 also uses the metadata 332 to add the datasets 330a-330d to a data catalog 320. The datasets 330a-330d can also be associated (e.g., within the data catalog 320 or otherwise) with one or more metadata-driven data transforms 322. The metadata-based processing engine 314 also stores or otherwise accesses a plurality of processing specifications 324. In this example, the processing specifications 324 include data pipelines 324a-324d in the form of dataflow graphs configured to access (e.g., read) the datasets 330a-330d from the storage system 304 and store (e.g., write) them in the storage system 306.

Figure 3B:
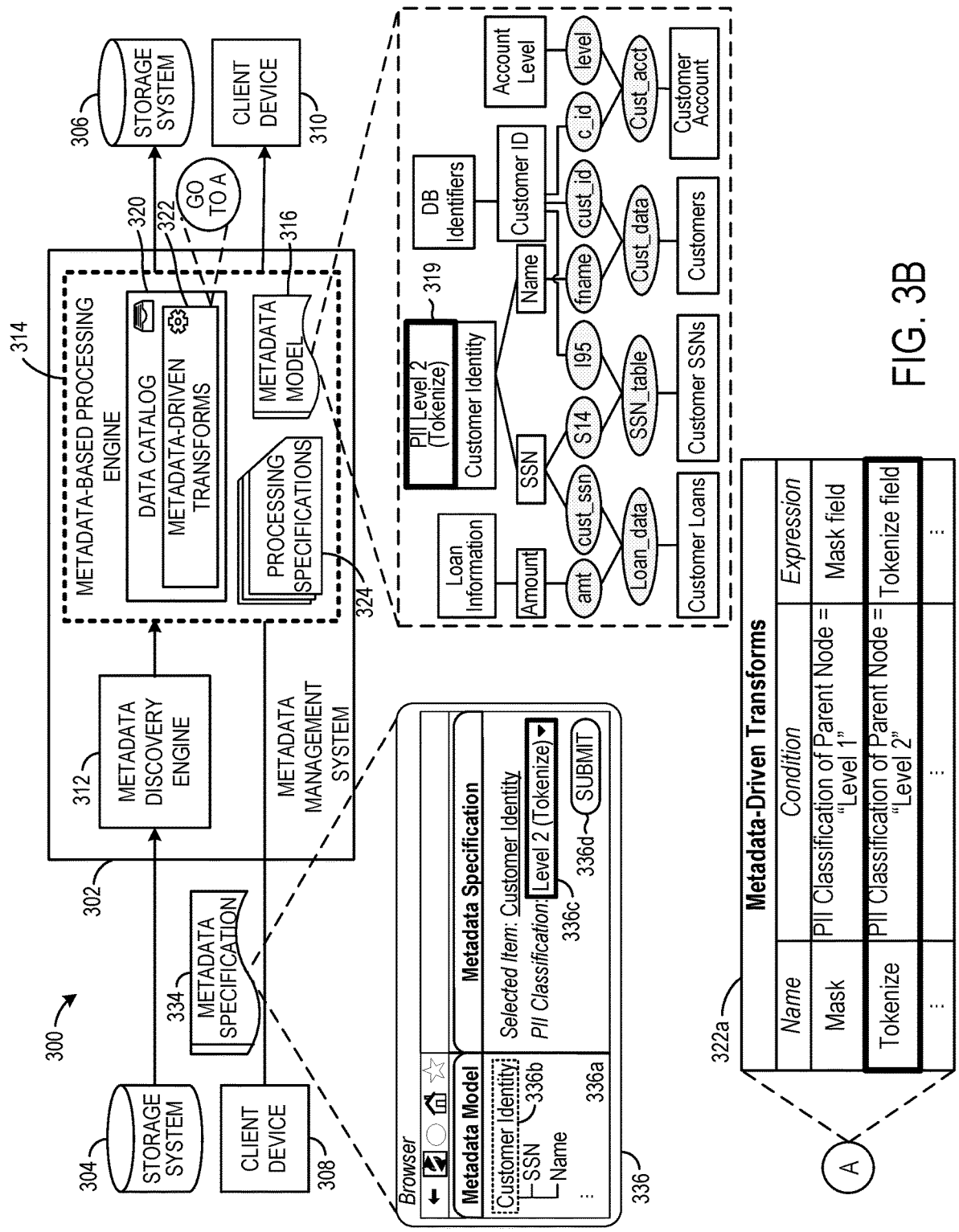

Referring to FIG. 3B, the metadata-based processing engine 314 can receive a metadata specification 334 from a user of the client device 308. In particular, the user can use the client device 308 to access a graphical user interface 336 that includes a visualization 336a of the metadata model 316. A user can interact with the visualization 336a of the metadata model to select an item of metadata for which metadata is to be specified. In this example, the user has selected 336b the item of metadata corresponding to "Customer Identity." After selecting an item of metadata, the user can specify metadata for that item of metadata. For example, the user can specify a PII classification 336c for the item of metadata, which is a form of PII specification. In this example, the user has specified that "Customer Identity" has a PII classification 336c of "Level 2 (Tokenize)." Once complete, the user can choose to submit 336d the metadata specification 334 to the metadata-based processing engine 314.

After receiving the metadata specification 334, the metadata-based processing engine 314 updates the model 316. For example, the metadata-based processing engine 314 can update the model 316 to indicate 319 that the node representing "Customer Identity" is associated with a Level 2 PII classification. As shown in the visualization 322a of the metadata-driven transforms 322, the metadata-based processing engine 314 is configured to tokenize fields associated with a node when a related node (e.g., a parent node) has a PII classification of "Level 2." Incorporating the metadata specification 334 into the metadata model 316 in this way reduces the amount of space required to store the metadata model 316. This is because the metadata specification 334 is only defined once in the model 316 (e.g., by adding an element with the specification 334 in the object or data structure representing "Customer Identity," or by adding a single new object or data structure with the specification 334 that points to the object or data structure representing "Customer Identity"), rather than defining the specification at each applicable node (which could amount to thousands of definitions, or more). As a result, only a single data element (or object or data structure) is added to the model 316 (as opposed to many), which reduces the storage and memory requirements for the model. Similar reductions in storage are also achieved through linking multiple nodes representing physical metadata (e.g., the "cust_ssn" and "S14" nodes) to a single node representing logical metadata (e.g., the "SSN" node), relative to defining and storing separate logical nodes for each physical node.

Figure 3C:
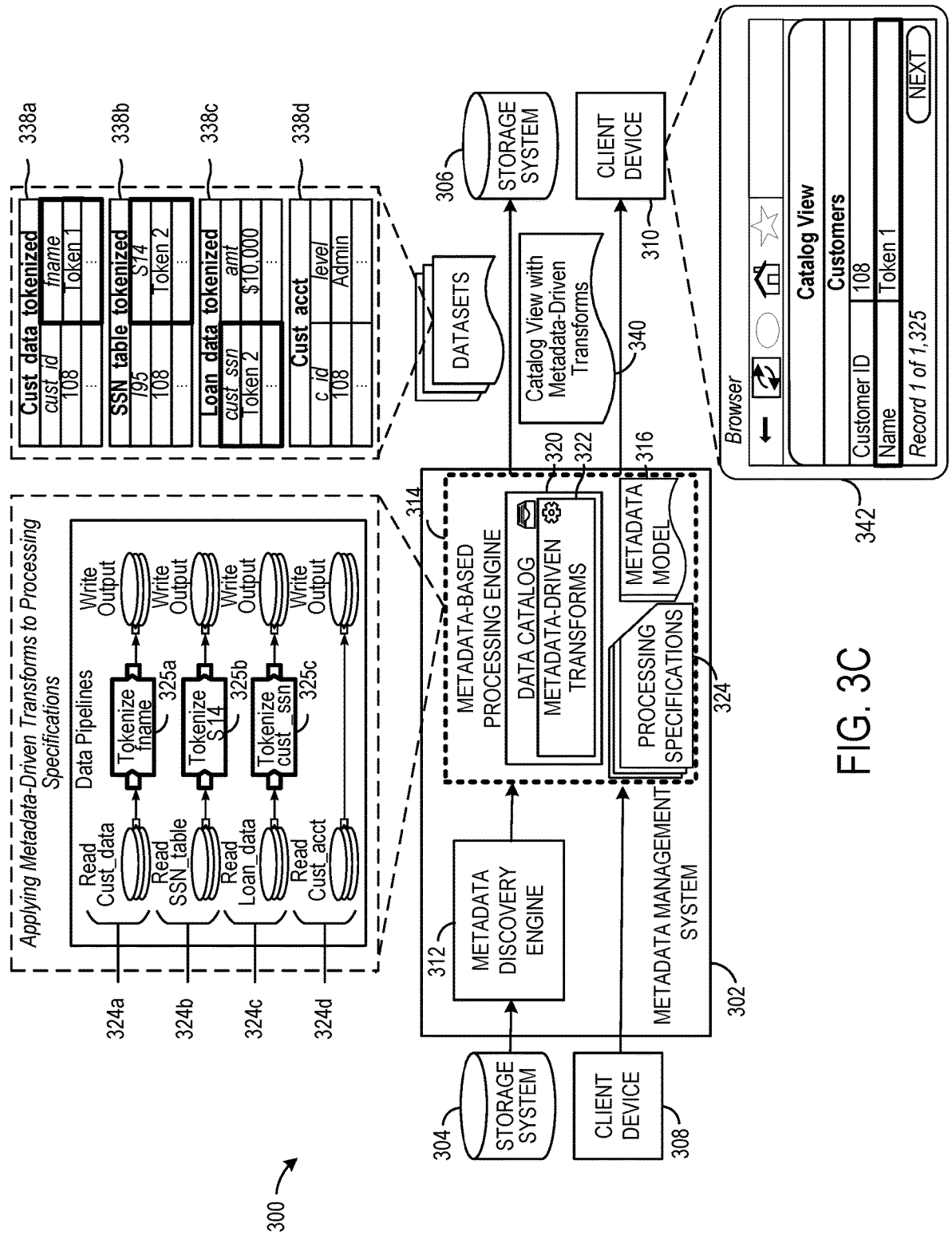

Referring to FIG. 3C, the metadata-based processing engine 314 uses the metadata model 316 to apply the metadata-driven data transforms 322 to the processing specifications 324 and, hence, the datasets 330a-330d. To do so, the metadata-based processing engine 314 can determine physical metadata for a data item being accessed, and can use the determined physical metadata to identify a node in the metadata model 316 that corresponds to the item of data. For example, when executing the processing specification 324a, the metadata-based processing engine 314 can identify a node in the metadata model 316 that corresponds to the name of the dataset 330a (e.g., "Cust_data") and/or the name of the fields of the dataset 330a (e.g., "cust_id," "fname"). In some examples, the identified node is referred to as the child node. The metadata-based processing engine 314 then traverses the metadata model 316 in accordance with the metadata-driven transforms 322 to determine operations to perform on the dataset 330a (if any). For example, the metadata-based processing engine 314 can traverse the metadata model 316 to identify one or more parent nodes of the identified child node, such as the nodes corresponding to "Customers," "Customer ID," "DB Identifiers," "Name," and "Customer Identity." In this example, the metadata-based processing engine 314 determines based on the metadata model 316 that the node representing "Customer Identity" that is associated with the "Level 2" PII classification is a parent of the node representing "fname" (e.g., through the "Name" node), but is not a parent of the node representing "cust_id." As a result, the metadata-based processing engine 314 inserts an operation 325a into the processing specification 324a to tokenize "fname." The metadata-based processing engine 314 can perform similar processes to insert tokenization operations 325b, 325c into processing specifications 324b, 324c. However, no tokenization operation is added to processing specification 324d, as there are no parent nodes associated with a PII classification of "Level 2" for the nodes corresponding to the dataset "Cust_acct" or its fields "c_id" and "level."

After applying the metadata-driven transforms 322, the metadata-based processing engine 314 can execute the processing specifications to produce datasets 338a-338d with tokenized PII data (where applicable). Each of the datasets 338a-338d can be sent to the storage system 306 for storage. The metadata-based processing engine 314 can also apply similar processing to generate tokenized catalog view data 340 for the dataset 330a (among others). The catalog view data 340 can be sent to the client device 310 for presentation in a graphical user interface 342 that allows a user to view each of the tokenized data records for the dataset 330a.

By leveraging metadata in this way, the system 300 enables a user to automatically implement operations, such as data security operations, across an entire data enterprise (e.g., across multiple data items, such as datasets 338a-338d and others) through a single, global metadata specification (e.g., the metadata specification 334) without the need for the user to identify the specific data items to which the operations apply, and without the need for the user to generate code on a data item by data item basis. As a result, the system 300 provides for more efficient implementation of data policies across an enterprise relative to systems that do not leverage metadata in such a way, thereby reducing the latency of implementing such policies. In addition, by automatically identifying and applying the operations based on metadata, the system 300 enhances data security (as well as the implementation of other data policies) by reducing the likelihood that data that should be subject to the policies is overlooked. Defining operations based on metadata also enables the system to automatically adapt to changes in the underlying data (e.g., changes in the name of the data, storage location of the data, keys for the data, etc.).

Figure 3D:
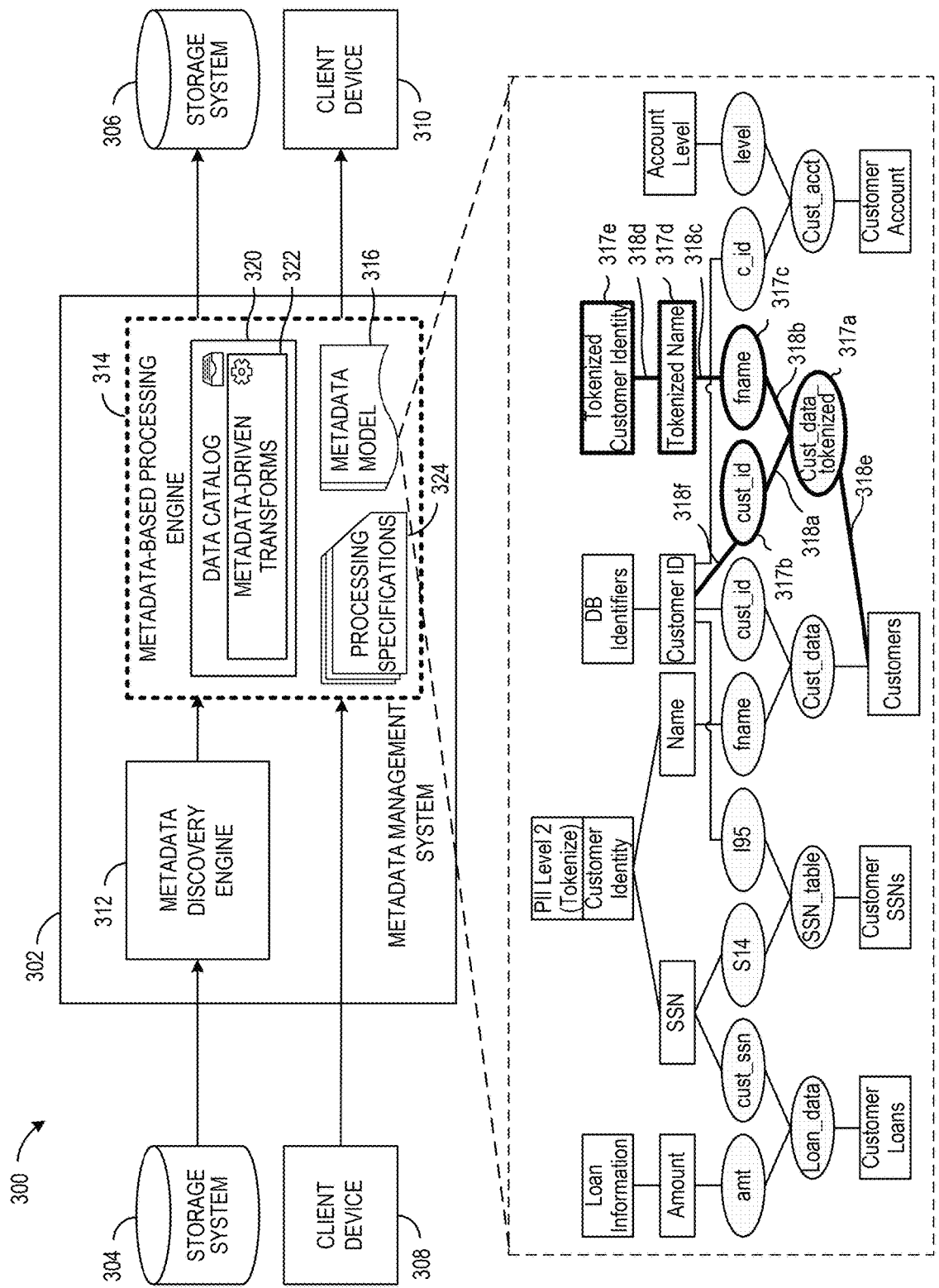

The metadata-based processing engine 314 can also update the metadata model 316 after applying the metadata-driven transforms 322, as shown in FIG. 3D. For example, the metadata-based processing engine 314 can update the metadata model 316 to incorporate metadata for the newly-defined "cust_data_tokenized" dataset 338a. For example, the metadata-based processing engine 314 can add nodes 317a, 317b, and 317c representing physical metadata for the dataset 338a, and edges 318a, 318b representing the relationships between the nodes 317a, 317b, and 317c. Since the "fname" field of the dataset 338a has been tokenized and no longer represents a First Name, the metadata-based processing engine 314 can also add logical nodes 317d, 317e (e.g., "Tokenized Name" and "Tokenized Customer Identity") that accurately describe the content of the tokenized field. Edges 318c, 318d can then be inserted to indicate the logical relationship between the nodes 317c, 317d, and 317e.

The metadata-based processing engine 314 can also propagate or replicate existing metadata in the metadata model 316 to populate the metadata for the new dataset 338a. In particular, the metadata-based processing engine 314 can insert an edge 318e representing the logical relationship between the dataset 338a and its corresponding logical entity (e.g., logical dataset "Customers"), as well as an edge 318f representing the logical relationship between the "c_id" field of the dataset 338a and its corresponding logical entity (e.g., logical data element "Customer ID"). Similar operations can be performed to update the metadata model 316 to incorporate metadata for datasets 338b-338d (not shown).

By updating the metadata model in this way, the computational resources needed for subsequent processing of the datasets 338a-338d can be reduced because the model has already been populated with metadata for the dataset 338a-338d, thereby avoiding the need for metadata discovery on these datasets. In addition, because the model has been updated to reflect that the "cust_ssn" field of the dataset 338a has been tokenized (among other fields of other datasets), the metadata-based processing engine 314 can use the previously tokenized data in lieu of retokenization during subsequent processing.

Figure 4A:
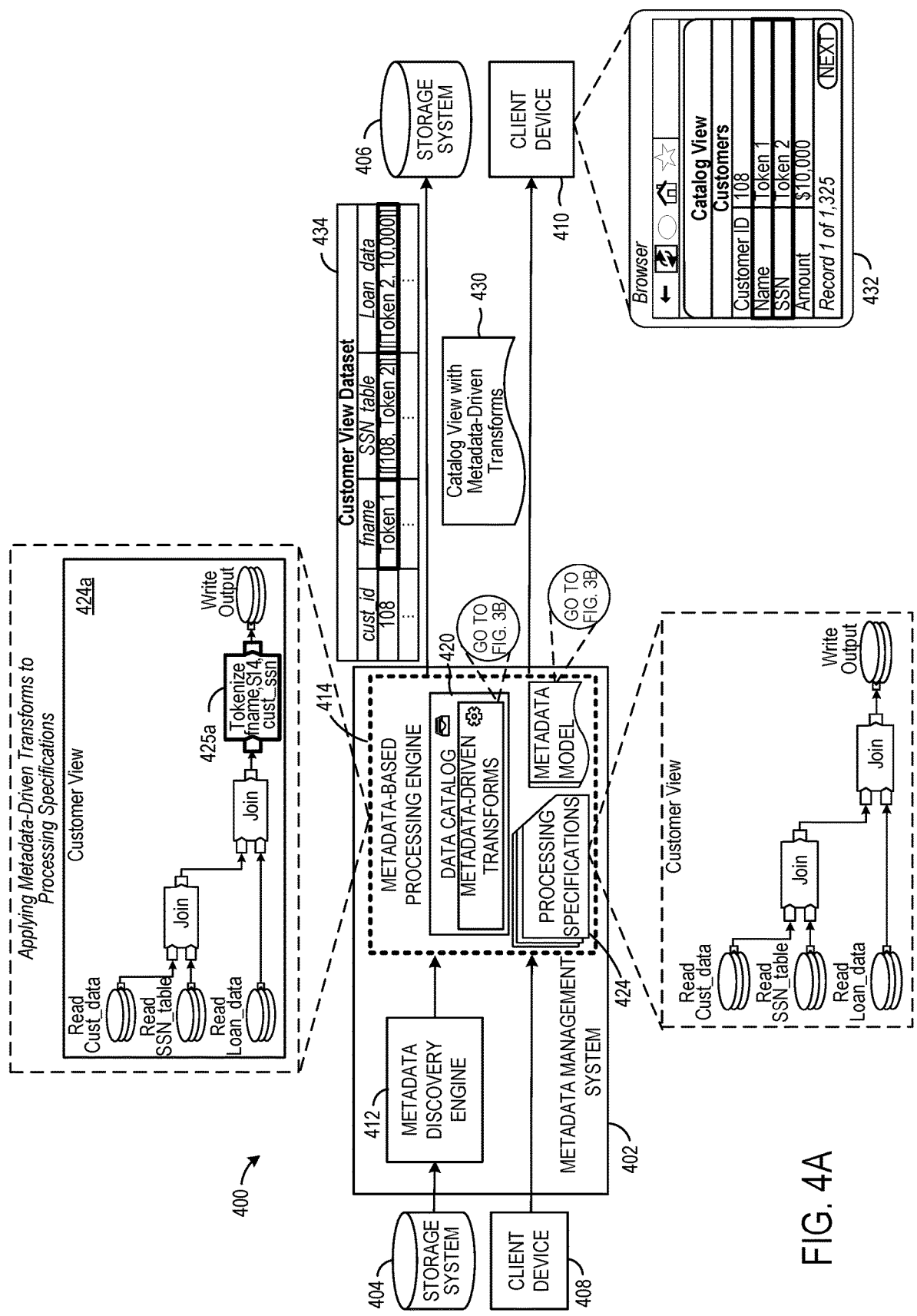
FIGS. 4A to 4D illustrate an example metadata management system configured to operationalize metadata to drop fields.

FIG. 4A illustrates a system 400, which is a variation of the system 300 shown in FIGS. 3A-3D. In this example, the system 400 includes a metadata management system 402, storage systems 404, 406, and client devices 408, 410. Similar to the metadata management systems 102, 202, and 302, the metadata management system 402 includes a metadata discovery engine 412 and a metadata-based processing engine 414. The metadata-based processing engine 414 stores or otherwise accesses a plurality of processing specifications 424 that include a processing specification 424a. In this example, the processing specification 424a instantiates a dataflow graph that defines a catalog view for multiple datasets (e.g., datasets 330a-330c) in the data catalog 420 from the perspective of the "Cust_data" dataset 330a. In other words, the dataset 330a is the root node in the catalog view defined by the processing specification 424a, with other datasets being joined to the dataset 330a based on the discovered relationships among the datasets 330a-330c.

The metadata-based processing engine 414 uses the techniques described herein to automatically apply metadata-driven transforms 322 (shown in FIG. 3B) to the processing specification 424a. In particular, the metadata-based processing engine 414 uses the metadata model 316 (shown in FIG. 3B) to determine that the fields "fname," "S14," and "cust_ssn" should be tokenized, and inserts a tokenization operation 425a into the processing specification 424. After applying the metadata-driven transforms 322, the metadata-based processing engine 414 can execute the processing specification 424a to generate tokenized catalog view data 430. The catalog view data 430 can be sent to the client device 410 for presentation in a graphical user interface 432 that allows a user to view the tokenized data records in the customers view. The metadata-based processing engine 414 can also generate a customer view dataset 434 (e.g., a wide record of the customer view) that is sent to the storage system 406 for storage.

Figure 4B:
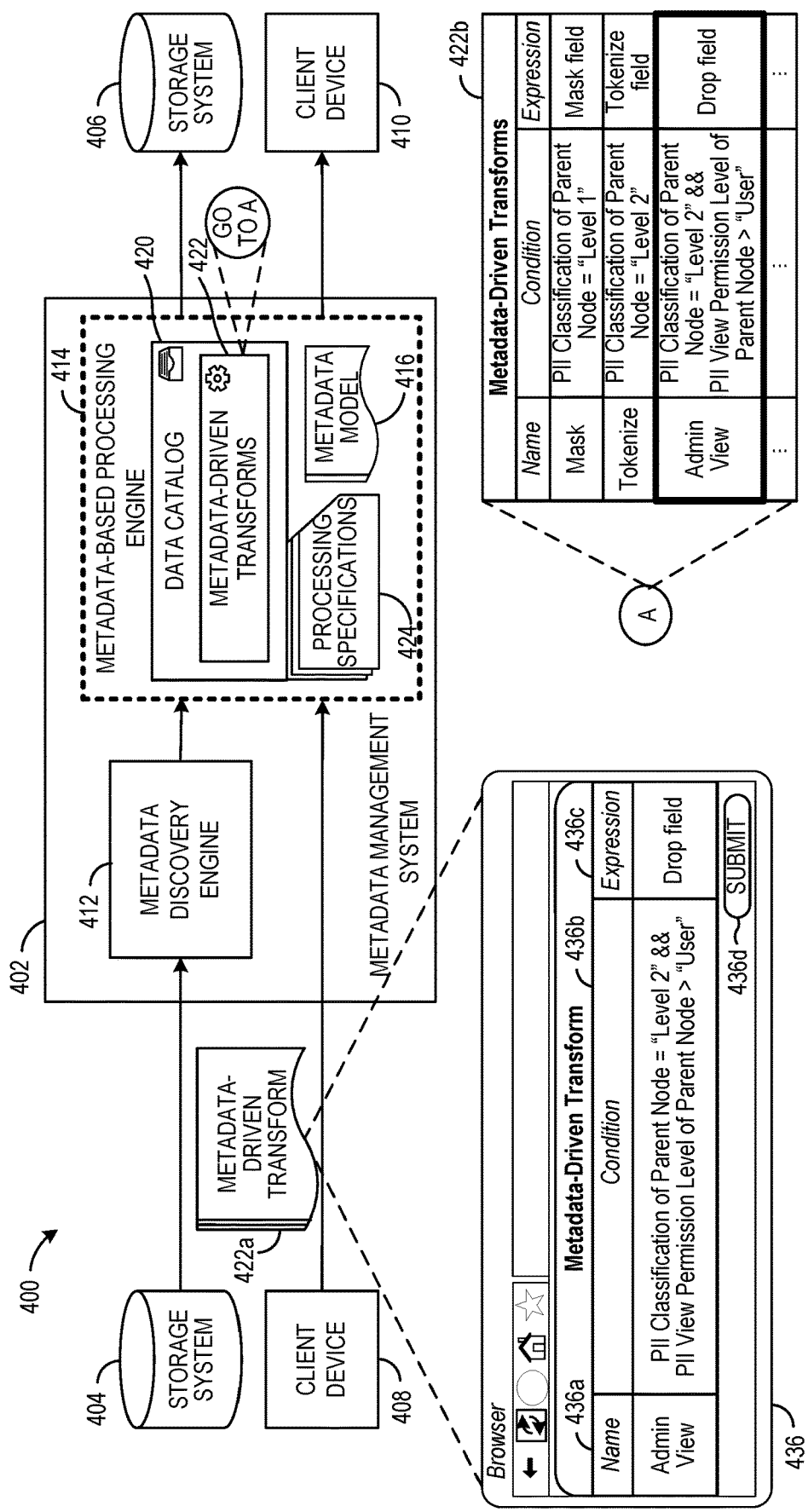

In some examples, the metadata-based processing engine 414 can receive a new metadata-driven transform 422a (or a modification to an existing metadata-driven transform) from a user of the client device 408, as shown in FIG. 4B. In particular, the user can use the client device 408 to access a graphical user interface 436 for defining the metadata-driven transform 422a. A user can interact with the user interface 436 to input a name 436a for the metadata-driven transform 422a, one or more conditions 436b for applying the transform, and one or more expressions 436c that specify operation(s) to be performed when the conditions 436b are satisfied. In this example, the user has defined a metadata-driven transform 422a named "Admin View" that causes a field to be dropped (e.g., removed from further processing) when the PII classification of a parent node is equal to "Level 2," and the PII view permission level of the parent node is greater than "User." In some examples, the user can also define the items or groups of items in the data catalog 420 to which the transform 422a applies (not shown). After defining the metadata-driven transform 422a, the user can choose to submit 436d the metadata-driven transform 422a to the metadata-based processing engine 414. The metadata-based processing engine 414 can then incorporate the metadata-driven transform 422a into the set of transforms 422 maintained by the system 400, as shown in the visualization 422b of the metadata-driven transforms 422.

Figure 4C:
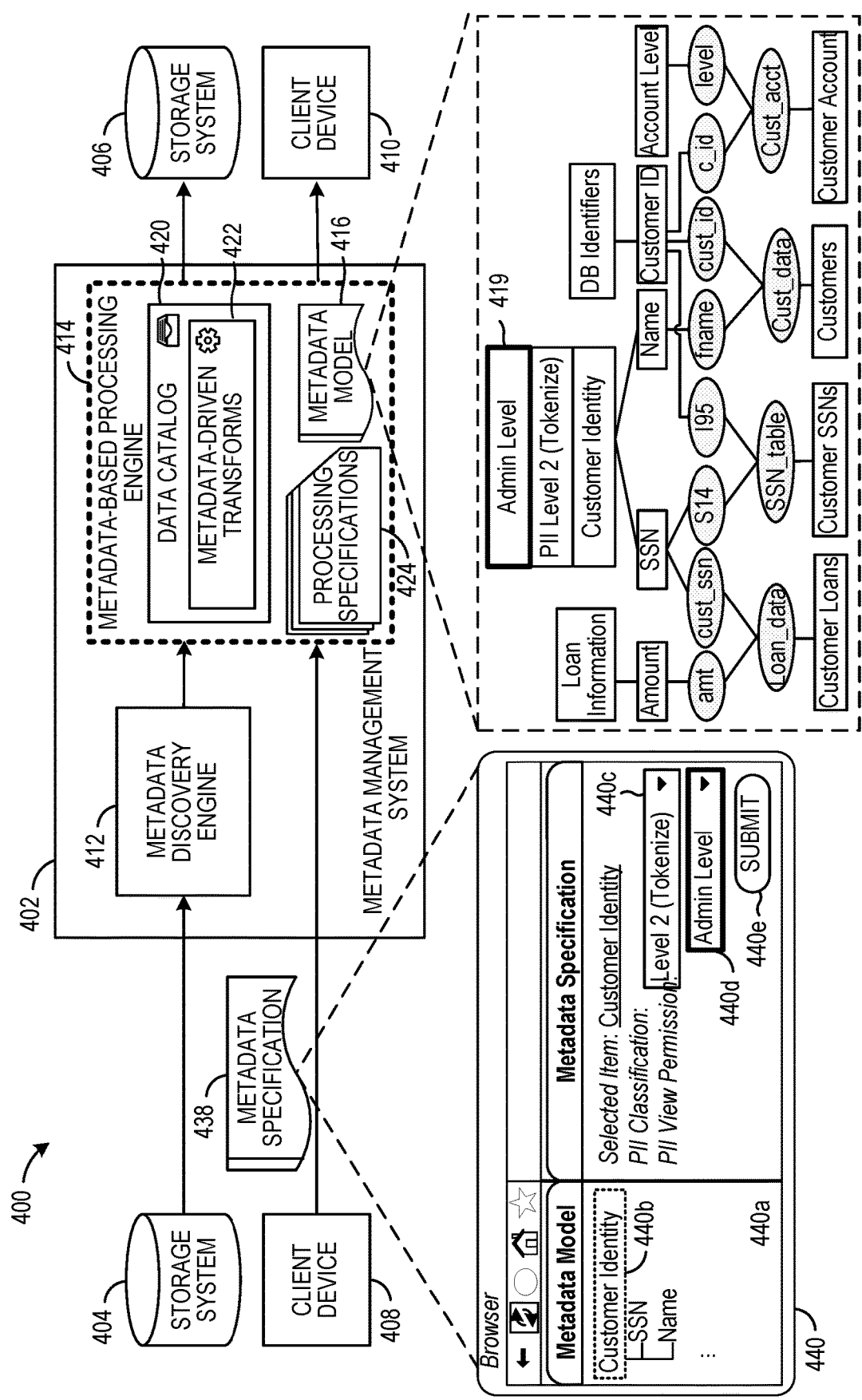

Referring to FIG. 4C, the metadata-based processing engine 414 can receive a metadata specification 438 from a user of the client device 408. In particular, the user can use the client device 408 to access a graphical user interface 440 that includes a visualization 440a of the metadata model 316 (shown in FIG. 3B). A user can interact with the visualization 440a of the metadata model to select an item of metadata for which metadata is to be specified. In this example, the user has selected 440b the item of metadata corresponding to "Customer Identity." After selecting an item of metadata, the user can specify metadata for that item of metadata. For example, the user can specify a PII view permission 440d for the item of metadata, which is a form of PII specification. In this example, the user has specified that "Customer Identity" has a PII view permission 440d of "Admin Level" (in addition to the PII classification 440c of "Level 2 (Tokenize) that was previously specified). Once complete, the user can choose to submit 440e the metadata specification 438 to the metadata-based processing engine 414. After receiving the metadata specification 438, the metadata-based processing engine 414 updates the model 316 (shown in FIG. 3B) to produce the model 416. For example, the metadata-based processing engine 414 can update the model 416 to indicate 419 that the node representing "Customer Identity" is also associated with an "Admin Level" PII view permission.

Figure 4D:
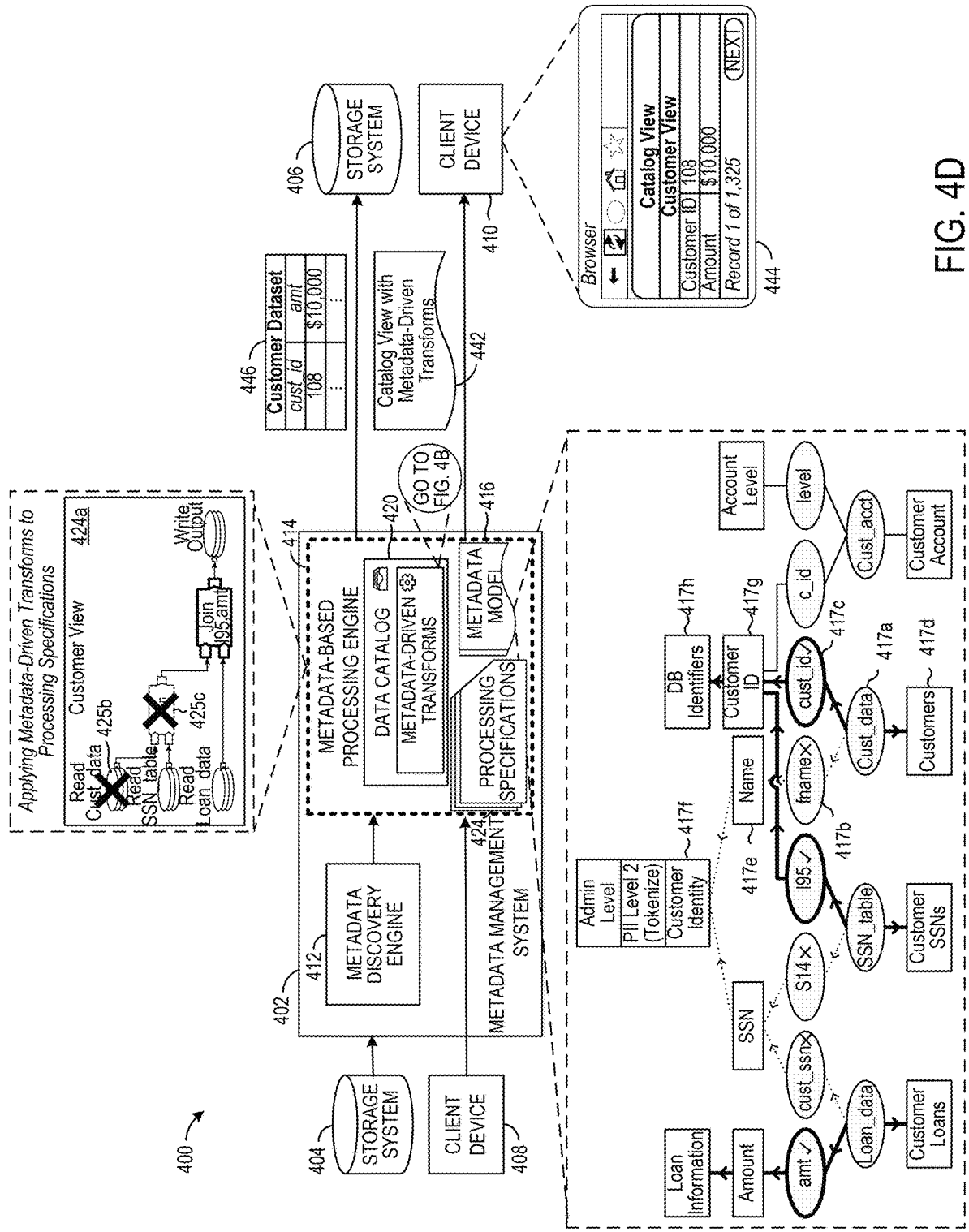

Referring to FIG. 4D, the metadata-based processing engine 414 can use the metadata model 416 to automatically apply the metadata-driven transforms 422, including the newly-defined metadata-driven transform 422a, to the processing specifications 424 and the underlying data. In this example, the metadata-based processing engine 414 identifies a node 417a corresponding to the "Cust_data" dataset that is accessed in the processing specification 424a. The metadata-based processing engine 414 then traverses the metadata model 416 as shown by the directional arrows to identify the nodes 417b, 417c corresponding to the fields of the "Cust_data" dataset, as well as nodes 417d-417h corresponding to logical parent nodes of the physical nodes. In this example, the metadata-based processing engine 414 determines that the field "fname" corresponding to the node 417c should be dropped (e.g., from further processing) because one of its parent nodes (e.g., node 417f, representing "Customer Identity") is associated with a "Level 2" PII classification (the first condition of metadata-driven transform 422a), and is also associated with an "Admin Level" PII view permission, which is greater than a "User Level" view permission (the second condition of metadata-driven transform 422a). The determination to drop the field "fname" is indicated in FIG. 4D by an "X" in the node 417b, and the traversal of the metadata model 416 to make this determination is shown by the dashed edges with directional arrows. Because field "fname" is associated with PII (through its parent node 417f), the metadata-based processing engine 414 may also determine that data contained within the field should be tokenized based on the "Tokenize" metadata-driven transform 422 (shown in FIG. 4B). However, the metadata-based processing engine 414 can determine that tokenizing data within the field is at odds with dropping the field altogether, and can decide that the drop operation has priority based on rules (e.g., optimization rules) maintained by the system 400.

On the other hand, the metadata-based processing engine 414 determines that the field "cust_id" should not be dropped because it does not have any parent nodes that satisfy both conditions specified by the metadata-driven transform 422a. Similarly, the metadata-based processing engine 414 determines that data within the field "cust_id" should not be tokenized because it does not have any parent nodes having a "Level 2" PII classification. The determination to keep (and not tokenize) the field "cust_id" is indicated in FIG. 4D by the checkmark and bold outline of the node 417c, and the traversal of the metadata model 416 to make this determination is shown by the bolded edges with directional arrows. Similar analysis of the metadata model 416 results in a determination to keep fields "I95" and "amt," and to drop fields "cust_ssn" and "S14." Note that the nodes for the dataset "Cust_acct" and related metadata are faded in this example because they are not relevant to the processing specification 424a.

The metadata-based processing engine 414 can use the information determined by traversing the metadata model 416 to update the processing specification 424a. For example, since the metadata-based processing engine 414 determined that fields "fname," "S14," and "cust_ssn," should be dropped in accordance with the metadata-driven transform 422a, the metadata-based processing engine 414 can update the processing specification to remove or modify the operations that access those fields. In some examples, after applying these modifications, the metadata-based processing engine 414 can optimize the processing specification 424a to remove redundant or unnecessary operations. For instance, in this example, the metadata-based processing engine 414 determines that the "Read Cust_data" operation 425b and the join operation 425c are no longer necessary, and can optimize out these operations as a result (as shown by the "X" through the respective operation).

After applying the metadata-driven transforms 422, the metadata-based processing engine 414 can execute the processing specification 424a to generate tokenized catalog view data 442. The catalog view data 442 can be sent to the client device 410 for presentation in a graphical user interface 444 that allows a user to view the tokenized data records in the customers view. The metadata-based processing engine 414 can also generate a customer view dataset 446 (e.g., a wide record of the customer view) that is sent to the storage system 406 for storage. As shown by the view data 442 and the dataset 446, the "fname," "S14," and "cust_ssn," fields (along with other redundant or unnecessary fields) have been dropped.

Figure 5A:
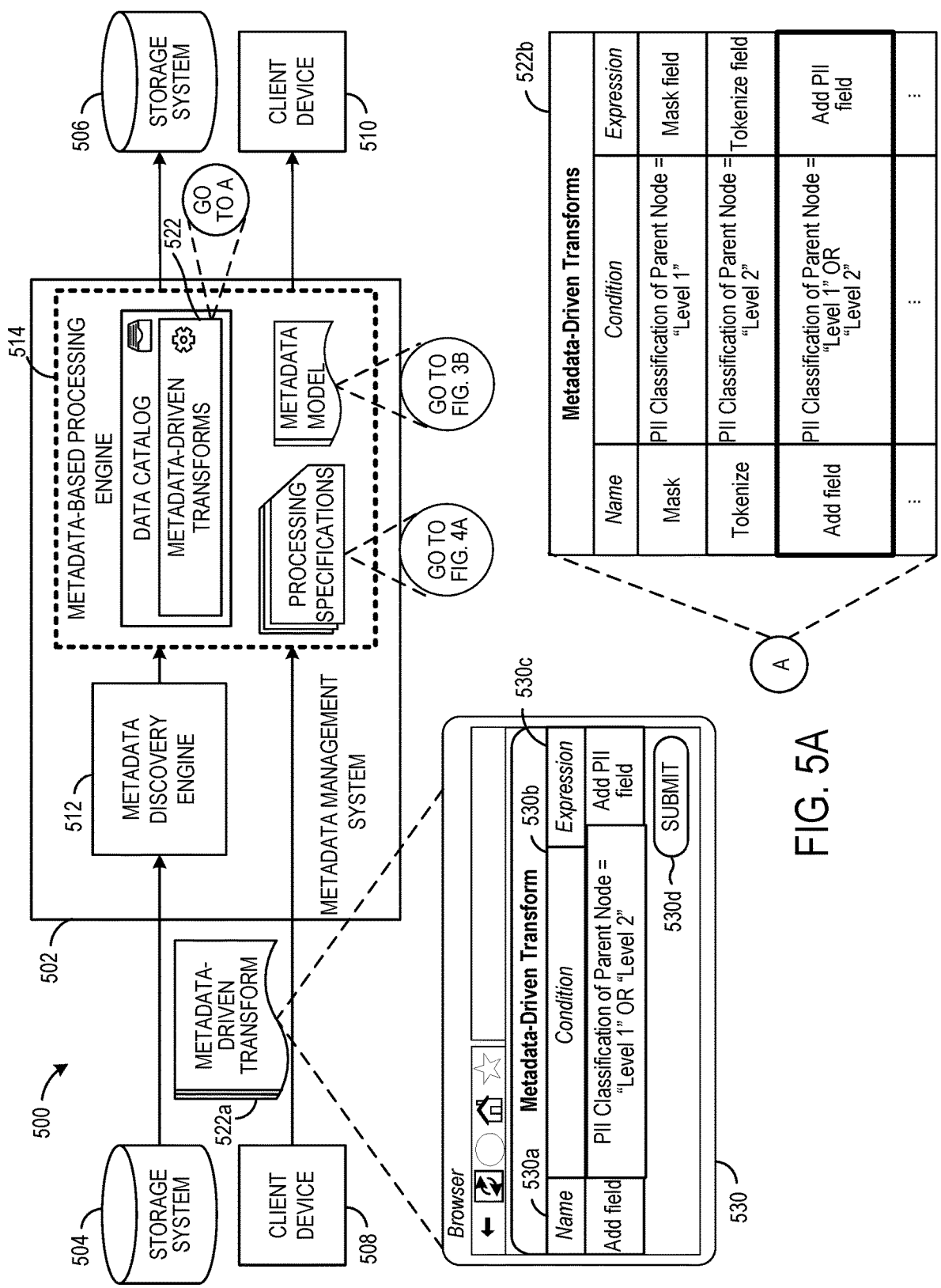
FIGS. 5A and 5B illustrate an example metadata management system configured to operationalize metadata to add fields.

FIG. 5A illustrates a system 500, which is a variation of the system 400 shown in FIGS. 4A-4D. In this example, the system 500 includes a metadata management system 502, storage systems 504, 506, and client devices 508, 510. Similar to the other metadata management systems described herein, the metadata management system 502 includes a metadata discovery engine 512 and a metadata-based processing engine 514. In this example, the metadata-based processing engine 514 receives a new metadata-driven transform 522a from a user of the client device 508. In particular, the user can use the client device 508 to access a graphical user interface 530 for defining the metadata-driven transform 522a. A user can interact with the user interface 530 to input a name 530a for the metadata-driven transform 522a, one or more conditions 530b for applying the transform, and one or more expressions 530c that specify operation(s) to be performed when the conditions 530b are satisfied. In this example, the user has defined a metadata-driven transform 522a named "Add field" that causes a field to be inserted into a dataset when the PII classification of a parent node is equal to "Level 1" or "Level 2." After defining the metadata-driven transform 522a, the user can choose to submit 530d the metadata-driven transform 522a to the metadata-based processing engine 514. The metadata-based processing engine 514 can then incorporate the metadata-driven transform 522a into the set of transforms 522 maintained by the system 500, as shown in the visualization 522b of the metadata-driven transforms 522.

Figure 5B:
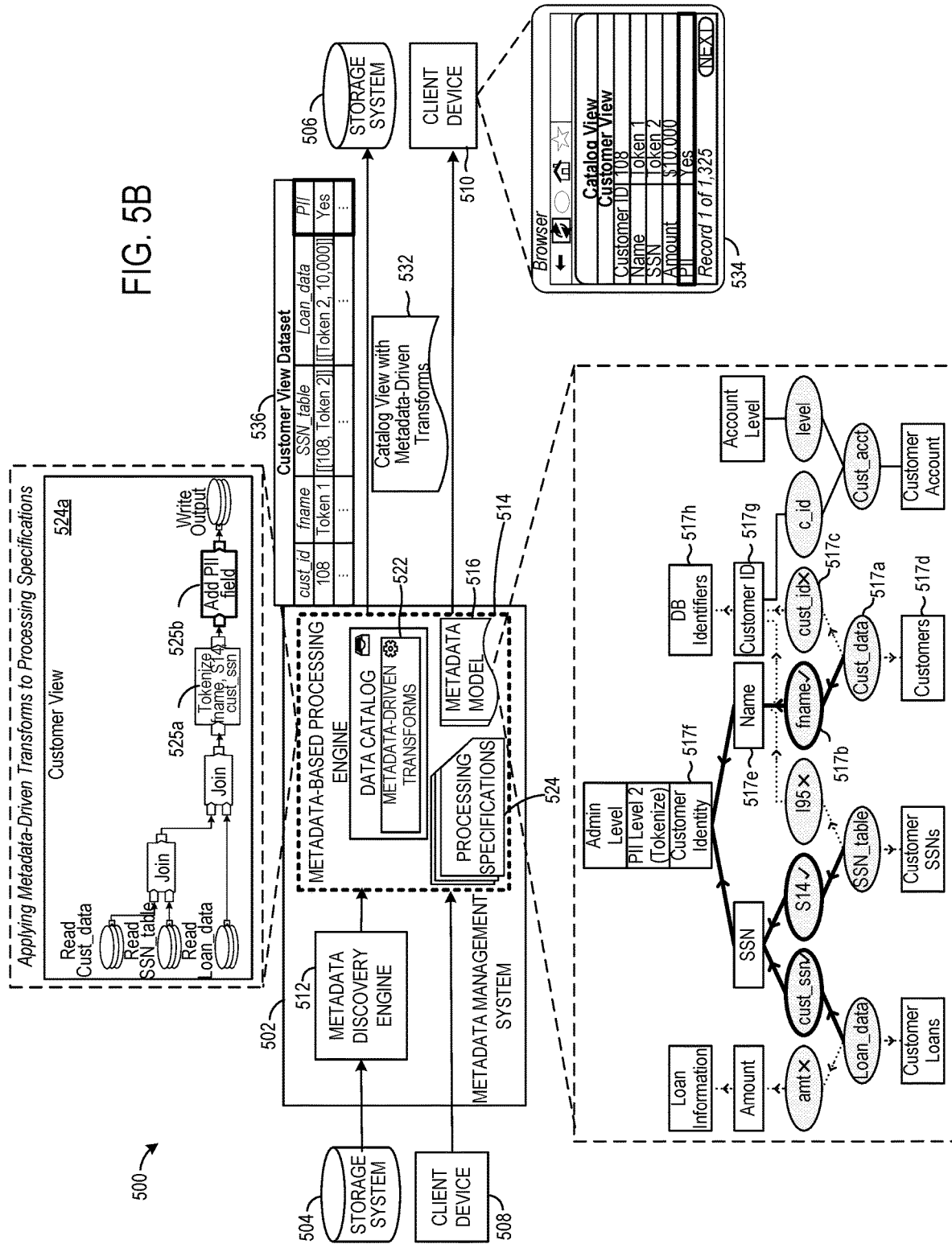

Referring to FIG. 5B, the metadata-based processing engine 514 can use the metadata model 516 to automatically apply the metadata-driven transforms 522 to the processing specifications 524 and the underlying data. In this example, the metadata-based processing engine 514 identifies a node 517a corresponding to the "Cust_data" dataset that is accessed in the processing specification 524a. The metadata-based processing engine 414 then traverses the metadata model 516 as shown by the directional arrows to identify the nodes 517b, 517c corresponding to the fields of the "Cust_data" dataset, as well as nodes 517d-517h corresponding to logical parent nodes of the physical nodes. In this example, the metadata-based processing engine 514 determines that the field "fname" corresponding to the node 517c has a parent node 517f (representing "Customer Identity") that is associated with a "Level 2" PII classification. As a result, the metadata-based processing engine 514 determines that a PII field should be added to the dataset containing "fname" (e.g., "Cust_data") in accordance with the metadata-driven transform 522a. Similarly, the metadata-based processing engine 514 also determines that data within the "fname" field should be tokenized based on the "Tokenize" metadata-driven transform (shown in FIG. 5B). The determination to add the PII field and tokenize data within the field "fname" is indicated in FIG. 5B by the checkmark and bold outline of the node 517b, and the traversal of the metadata model 516 to make this determination is shown by the bolded edges with directional arrows.

On the other hand, the metadata-based processing engine 514 determines that a PII field should not be added to the dataset containing the field "cust_id" in accordance with the metadata-driven transform 522a because it does not have any parent nodes associated with PII. For this same reason, the metadata-based processing engine 514 determines that data within the "cust_id" does not need to be tokenized. The determination to not add a PII field and not tokenize data within the "cust_id" field is indicated in FIG. 5B by the "X" in the node 517c, and the traversal of the metadata model 516 to make this determination is shown by the dashed edges with directional arrows. Similar analysis of the metadata model 516 results in a determination to add a PII field and tokenize data within the "cust_ssn" and "S14" fields, and to not add a PII field and not tokenize data within the "I95" and "amt" fields. Note that the nodes for the dataset "Cust_acct" and related metadata are faded in this example because they are not relevant to the processing specification 524a.

The metadata-based processing engine 514 can use the information determined by traversing the metadata model 516 to update the processing specification 524a. For example, since the metadata-based processing engine 514 determined that a PII field should be added to datasets containing the "fname," "S14," and "cust_ssn" fields, and that data within these fields should be tokenized, the metadata-based processing engine 514 can update the processing specification to include a tokenize operation 525a to tokenize these fields, and an add PII operation 525b to add the PII field with a value of "Yes" to each respective dataset. In some examples, the metadata-based processing engine 514 can optimize the processing specification 524a to remove redundant or unnecessary operations, such as by only adding a single PII field to the generated dataset (as shown in FIG. 5B).

After applying the metadata-driven transforms 522, the metadata-based processing engine 514 can execute the processing specification 524a to generate tokenized catalog view data 532. The catalog view data 532 can be sent to the client device 510 for presentation in a graphical user interface 534 that allows a user to view the tokenized data records in the customers view. The metadata-based processing engine 514 can also generate a customer view dataset 536 (e.g., a wide record of the customer view) that is sent to the storage system 506 for storage. As shown by the view data 532 and the dataset 536, a PII field with a value of "Yes" has been added.

Figure 6A:
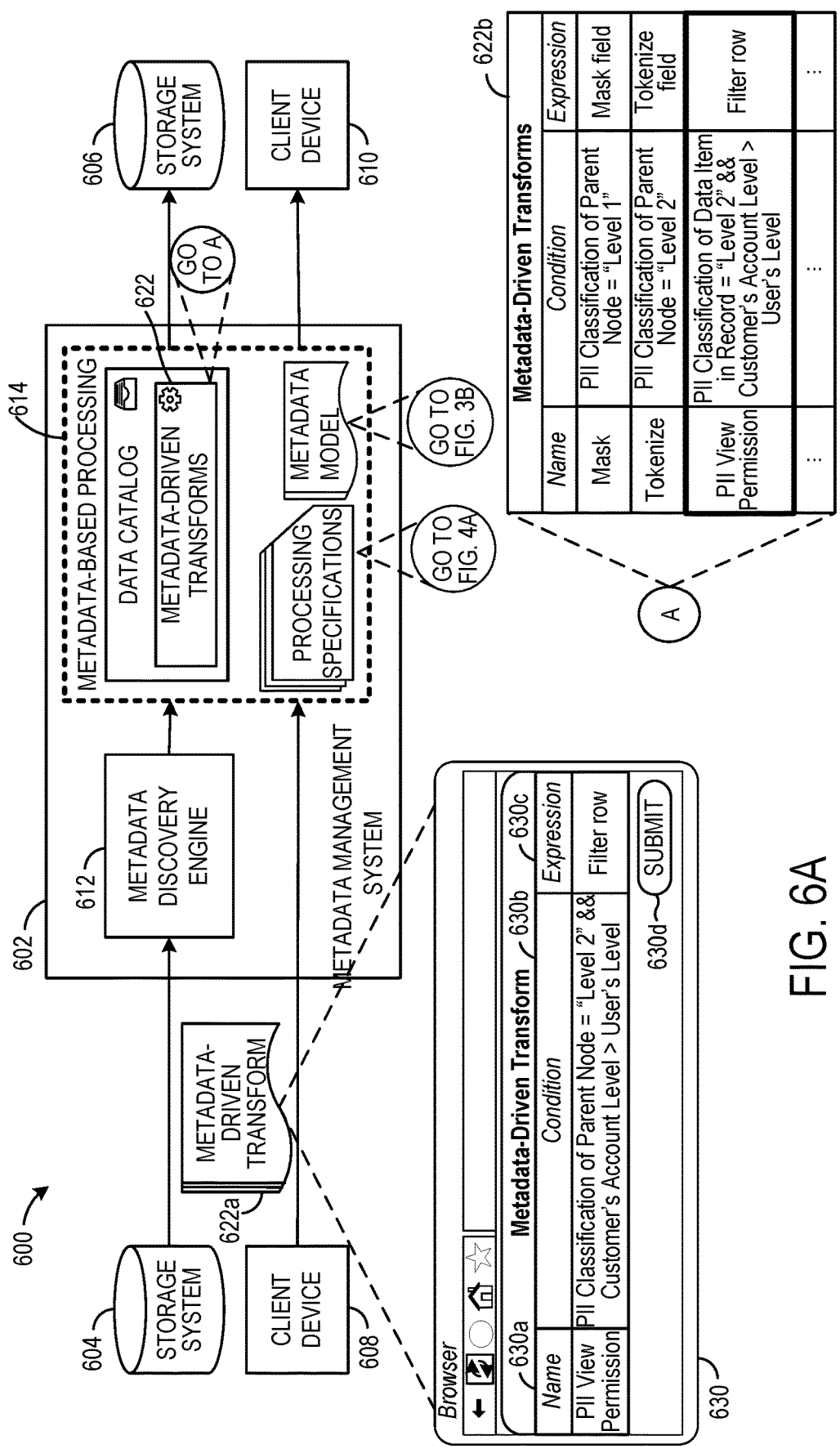
FIGS. 6A and 6B illustrate an example metadata management system configured to operationalize metadata to filter rows.

FIG. 6A illustrates a system 600, which is a variation of the system 500 shown in FIGS. 5A-5B. In this example, the system 600 includes a metadata management system 602, storage systems 604, 606, and client devices 608, 610. Similar to the other metadata management systems described herein, the metadata management system 602 includes a metadata discovery engine 612 and a metadata-based processing engine 614. In this example, the metadata-based processing engine 614 receives a new metadata-driven transform 622a from a user of the client device 608. In particular, the user can use the client device 608 to access a graphical user interface 630 for defining the metadata-driven transform 622a. A user can interact with the user interface 630 to input a name 630a for the metadata-driven transform 622a, one or more conditions 630b for applying the transform, and one or more expressions 630c that specify operation(s) to be performed when the conditions 630b are satisfied. In this example, the user has defined a metadata-driven transform 622a named "PII View Permission" that causes a row (e.g., data record) to be filtered from a dataset when the PII classification of a parent node is equal to "Level 2," and the customer's account level is greater than the user's level (e.g., the level of the user accessing the data). After defining the metadata-driven transform 622a, the user can choose to submit 630d the metadata-driven transform 622a to the metadata-based processing engine 614. The metadata-based processing engine 614 can then incorporate the metadata-driven transform 622a into the set of transforms 622 maintained by the system 600, as shown in the visualization 622b of the metadata-driven transforms 622.

Figure 6B:
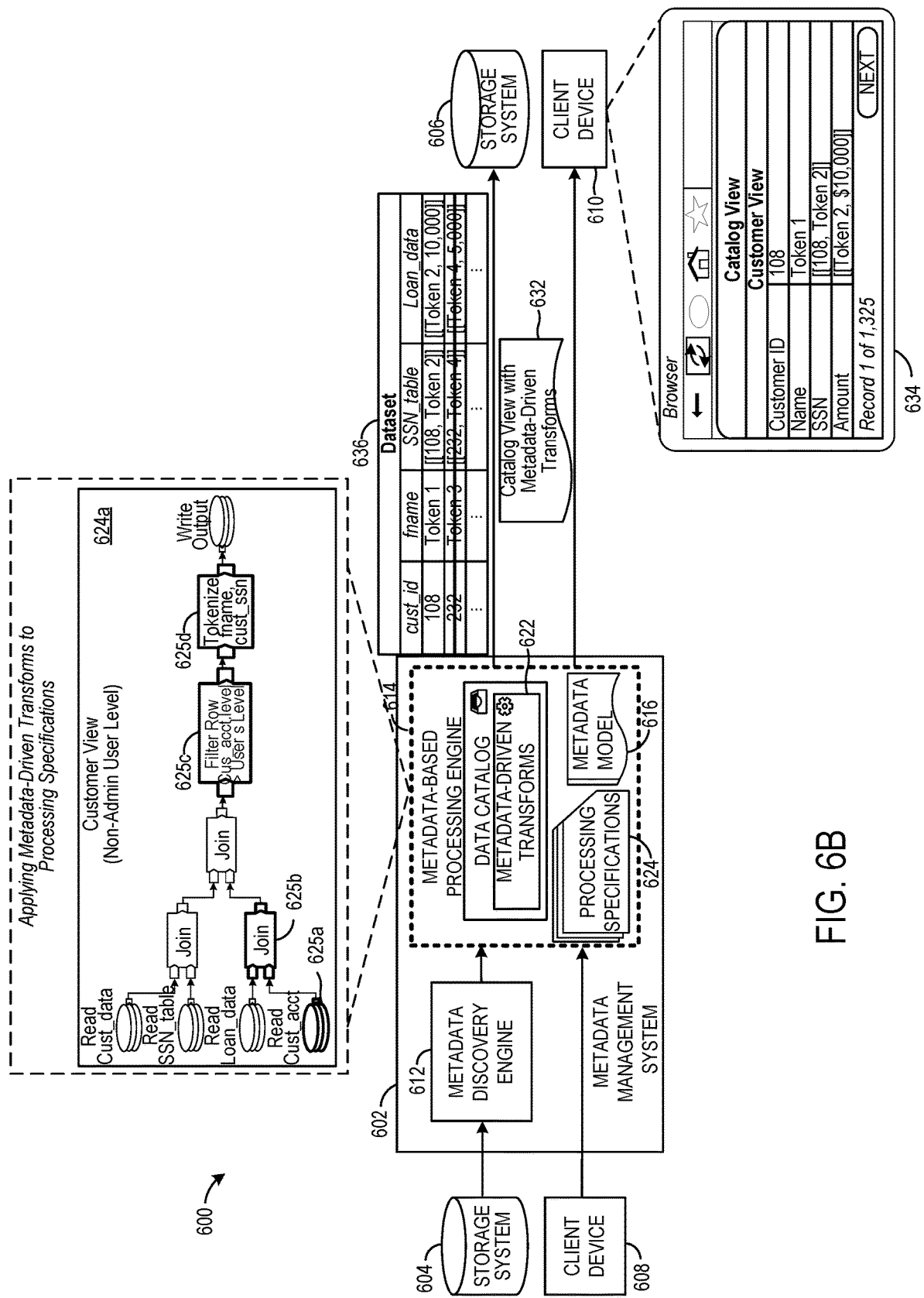

Referring to FIG. 6B, the metadata-based processing engine 614 can use the metadata model 616 to automatically apply the metadata-driven transforms 622 to the processing specifications 624 and the underlying data. In this example, a user having a non-admin user level has requested access to the customer view defined by the processing specification 624a. Because the metadata-driven transform 622a calls for a run-time comparison of the user's level with the customer's account level to determine whether to filter a row, the metadata-based processing engine 614 adds a read operation 625a to read the "Cust_acct" dataset, and a join operation 625b to join the "Cust_acct" dataset to the "Loan_data" dataset. In some examples, the metadata-based processing engine 614 can use metadata included within the metadata model 616 (or the data catalog) to determine how to access the "Cust_acct" dataset and join it with the existing datasets (e.g., the "Loan_data" dataset). The metadata-based processing engine 614 can also insert a filter row operation 625c that filters a row when the condition "Cust_acct.level>User's Level" is satisfied. The metadata-based processing engine 614 also adds a tokenize operation 625d to tokenize data in accordance with the "Tokenize" metadata-driven transform 622, as described herein.

After applying the metadata-driven transforms 622, the metadata-based processing engine 614 can execute the processing specification 624a to generate catalog view data 632. The catalog view data 632 can be sent to the client device 610 for presentation in a graphical user interface 634 that allows a user to view the data records in the customers view when the filter condition is satisfied. The metadata-based processing engine 614 can also generate a customer view dataset 636 (e.g., a wide record of the customer view) that is sent to the storage system 606 for storage. As shown by the dataset 636, a row is filtered out (as shown by the struck-through row) when the filter condition is satisfied. Note that although the metadata-based processing engine 614 has added the operation 625a to access the "Cust_acct" dataset for purposes of the filter condition, the data associated with the "Cust_acct" dataset is not output in accordance with the processing specification 624a.

Figure 7A:
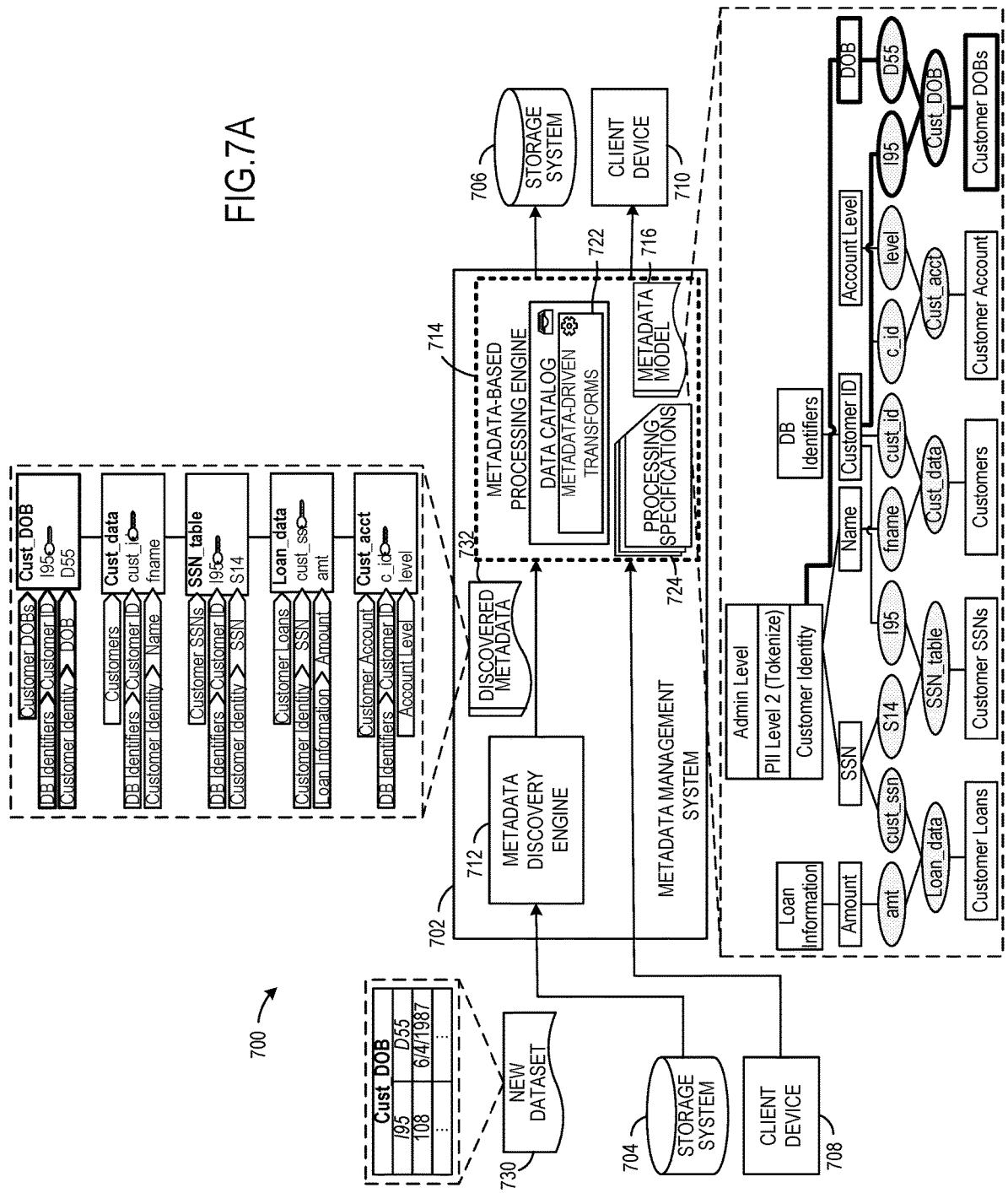
FIGS. 7A and 7B illustrate an example metadata management system configured to operationalize metadata to adapt to changes in data.

FIG. 7A illustrates a system 700, which is a variation of the system 600 shown in FIGS. 6A-6B. In this example, the system 700 includes a metadata management system 702, storage systems 704, 706, and client devices 708, 710. Similar to the other metadata management systems described herein, the metadata management system 702 includes a metadata discovery engine 712 and a metadata-based processing engine 714.

In this example, the metadata discovery engine 712 receives a new dataset 730 from the storage system 704. The metadata discovery engine 712 processes the dataset as described herein to discover or otherwise obtain metadata 732 for the new dataset 730. In particular, the metadata discovery engine 712 determines that the dataset 730 has a name "Cust_DOB" and includes fields "I95" (which serves as a primary key, as indicated by the key symbol) and "D55." The metadata discovery engine 712 also determines based on semantic analysis of the dataset 730 and its data that the dataset 730 "Cust_DOB" represents information about "Customer DOBs," that the field "I95" represents a "Customer ID," which is part of the group "DB Identifiers," and that the field "D55" represents a customer's "DOB," which is part of the group "Customer Identity." The metadata discovery engine 712 also determines that the dataset 730 is related to the dataset 330a (e.g., through a primary-foreign key relationship).

The metadata discovery engine 712 passes the discovered metadata 732 to the metadata-based processing engine 714. The metadata-based processing engine 714 uses the metadata 732 to update the metadata model 716. In particular, the metadata-based processing engine 714 can add nodes representing the items of physical and logical metadata 732 for the dataset 730, and add edges representing relationships between the nodes. These additions are shown in bold in the metadata model 716 of FIG. 7A.

Figure 7B:
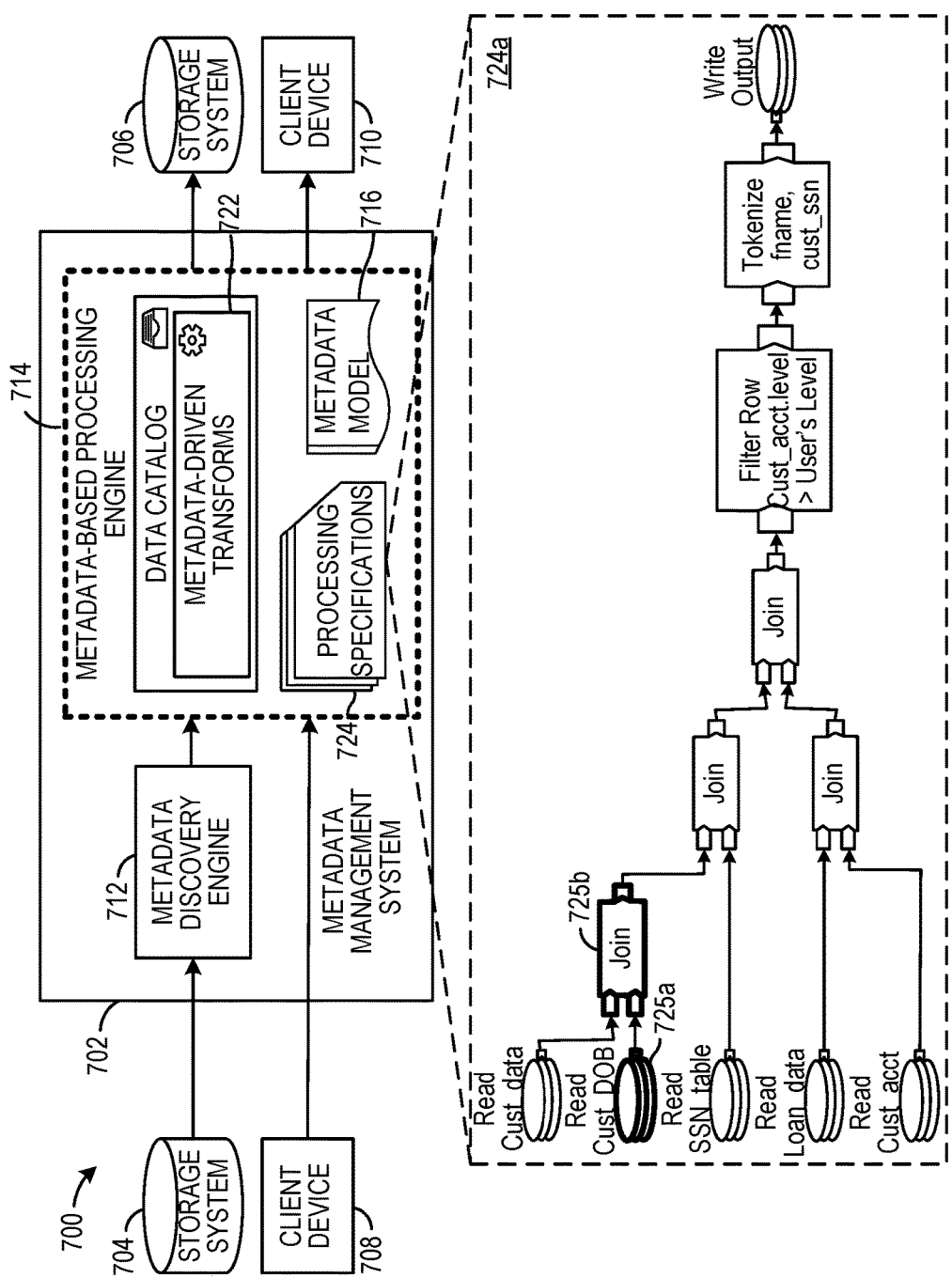

Referring to FIG. 7B, the metadata-based processing engine 714 uses the metadata model 716 to update the processing specifications 724. In particular, the metadata-based processing engine 714 uses the metadata model 716 to update a processing specification 724a, which can specify the generation of a wide data record that includes all of the connected datasets related to "Cust_data." In this example, the metadata-based processing engine 714 uses the metadata (e.g., metadata describing access parameters for the dataset) in the metadata model 716 to update the processing specification 724a to include an access operation 725a configured to read the new dataset 730. The metadata-based processing engine 714 also uses the metadata (e.g., metadata describing primary-foreign key relationships) in the metadata model 716 to include a join operation 725b configured to join the dataset 730 to the dataset "Cust_data." The metadata-based processing engine 714 can also use the metadata model 716 to apply the metadata-driven transforms 722 to the processing specification 724a that now includes the new dataset 730. By leveraging metadata in this way, the system 700 can automatically adapt the processing of data to account for changes in the underlying data (including the addition of new data, such as the dataset 730), without requiring a user to redefine or recode the underlying specification.

Figure 8:
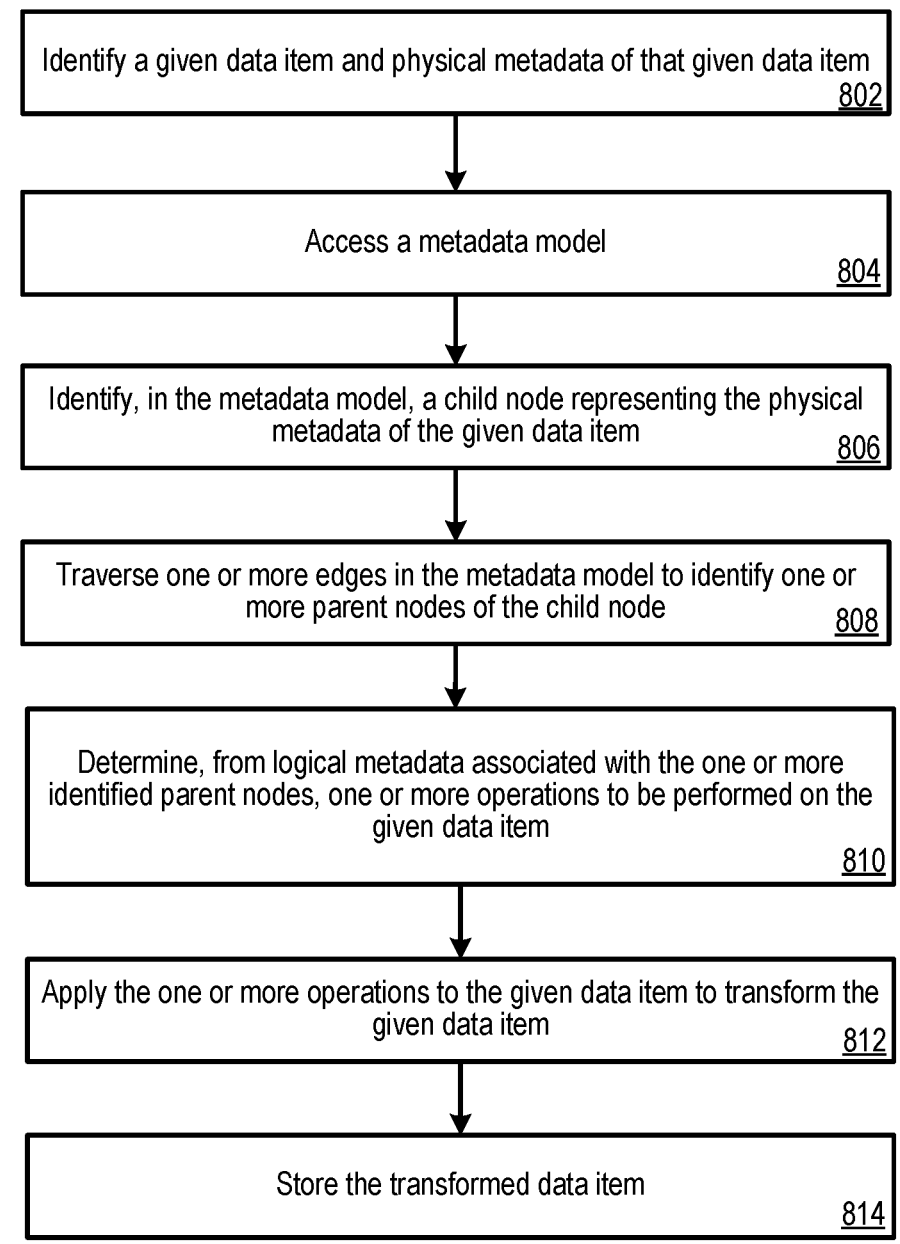
FIG. 8 is an example process for using metadata to automate operations on data.

FIG. 8 illustrates a flowchart of an example process 800 for using metadata to automate the identification of operations and their application on data. The process 800 can be implemented by one or more of the systems and components (e.g., the metadata management system or a component thereof, such as the metadata discovery engine, metadata-based processing engine, etc.) described herein, including one or more computing systems configured to implement the technology described with reference to FIGS. 1-7.

Operations of the process 800 include identifying 802 a given data item and physical metadata of that given data item. In some examples, identifying the given item of data includes identifying the given item of data that is accessed according to a processing specification. After identifying the given data item and the physical metadata for the data item, a metadata model is accessed 804. In general, the metadata model can include parent nodes and child nodes connected by edges, with the parent nodes specifying logical metadata and the child nodes specifying physical metadata representing the data items, and with the edges specifying relationships between the nodes. In some examples, the metadata model includes a first data structure corresponding to the parent nodes, the data structure including the logical metadata and at least a first pointer and a second pointer, in which the first pointer points to a second data structure corresponding to the child node that represents the physical metadata of the given data item, and the second pointer points to a third data structure corresponding to another child node that represents physical metadata of another data item different from the given data item.

A child node representing the physical metadata of the given data item is identified 806 in the metadata model. In some examples, identifying the child node representing the physical metadata of the given data item includes matching the physical metadata of the given data item to physical metadata represented by the child node in the metadata model.

One or more edges in the metadata model are traversed 808 to identify one or more parent nodes of the child node. Based on logical metadata associated with the one or more identified parent nodes, one or more operations to be performed on the given item of data are determined 810. In some examples, the metadata (e.g., logical metadata) associated with the one or more parent nodes includes metadata received from a user by interaction with the metadata management system. For example, the user can access a graphical user interface that includes a visualization of the metadata model, and can interact with the metadata model to select an item of metadata associated with one or more nodes (e.g., parent nodes) and specify metadata for those nodes. For example, the metadata received from the user can be a personally identifiable information (PII) specification that was specified by the user by an interaction with the visualization of the metadata model to select an item of metadata associated with one or more of the parent nodes for which the PII specification is to be specified in the model. In some examples, the metadata model can be updated after receiving of the metadata specification (e.g., the PII specification) to associate the logical metadata with the one or more parent nodes, such as indicating in the model that the one or more of the parent nodes associated with the selected item of metadata are associated with the PII specification. In some examples, the one or more operations applied to the given data item to transform the given data item includes tokenizing one or more fields of the given data item based on, e.g., the PII specification.

In some examples, one or more metadata transforms are accessed to determine the one or more operations to be performed on the given data item, with each metadata transform specifying at least one operation to be performed on data and at least one condition for performing the at least one operation. The metadata transforms can then be used in conjunction with the metadata to determine the one or more operations to be performed on the given data item. For example, a metadata transform can be selected from the one or more metadata transforms, and it is determined whether the logical metadata associated with the one or more parent nodes satisfies the at least condition of the selected metadata transform. When it is determined that the logical metadata associated with the one or more parent nodes satisfies the at least one condition of the selected metadata transform, it can be determined that the one or more operations to be performed on the given data item includes the at least one operation specified by the selected metadata transform.

The one or more operations are applied 812 to the given data item to transform the data item. In general, applying the one or more operations to the given data item can include transforming the data item, dropping (e.g., from further processing by a computer program) the data item or a data field associated with the data item, adding a data field to the data item or a dataset associated with the data item, or filtering a data record associated with the data item, among others. For example, the one or more operations to be performed on the given data item can include a tokenization operation, and applying the one or more operations to the given data item to transform the given data item includes applying the tokenization operation to the given data item to tokenize one or more fields of the given data item. In some examples, applying the one or more operations to the given item of data includes inserting the one or more operations into the processing specification, and executing the processing specification to apply the one or more operations to the given item of data. In some examples, the processing specification is a specification for a dataflow graph, and applying the one or more operations to the given item of data includes executing the dataflow graph, with executing the dataflow graph applying the one or more operations to the given item of data. After applying the one or more operations to the data item, the data item can be stored 814 (e.g., in memory or another hardware storage device), displayed to a user, or both.

In some examples, the metadata model is updated based on the transformed data item. For example, one or more nodes representing metadata for the transformed data item can be added to the metadata model, with the added one or more nodes representing metadata for the transformed data item. Some of the added nodes can be replications of some of the nodes that were already existing in the metadata model before the updating. As another example, one or more edges can be added to the metadata model to propagate existing metadata to the transformed data item. For example, one or more edges can be added to existing nodes in the metadata model to propagate or connect the existing nodes in the metadata model to the added nodes for the transformed data item. The updated metadata model can be output for further processing of a data item.

In some examples, the operations 800 can further include identifying physical metadata of the transformed data item; identifying, in the updated metadata model, a child node representing the physical metadata of the transformed data item; traversing one or more edges in the updated metadata model to identify one or more parent nodes of the child node that represents the physical metadata of the transformed data item; and determining, from logical metadata associated with the one or more parent nodes identified by traversing the one or more edges in the updated metadata model, that the one or more operations performed on the given data item are not to be performed on the transformed data item. Determining that the one or more operations performed on the given data item are not to be performed on the transformed data item can include determining that the logical metadata associated with the one or more parent nodes identified by traversing the one or more edges in the updated metadata model is different from the logical metadata associated with the one or more parent nodes identified by traversing the one or more edges in the metadata model.

In some examples, the operations 800 can further include identifying physical metadata of the transformed data item; identifying, in the updated metadata model, a child node representing the physical metadata of the transformed data item; traversing one or more edges in the updated metadata model to identify one or more parent nodes of the child node that represents the physical metadata of the transformed data item; determining, from logical metadata associated with the one or more parent nodes identified by traversing the one or more edges in the updated metadata model, one or more second operations to be performed on the transformed data item; applying the one or more second operations to the transformed data item to further transform the transformed data item; and storing the further transformed data item.

In some examples, the operations 800 can further include accessing a plurality of data items stored in hardware storage; for each data item of the plurality of data items, identifying physical metadata and logical metadata corresponding to the data item; generating the metadata model based on the physical metadata and the logical metadata identified for each of the plurality of data items; and providing access to the metadata model for a first application and a second application. The first and/or second applications can be dataflow graphs or other computer programs executing on, for example, the metadata management system or a client device, among other data processing systems. At least one of the first application or the second application can access the metadata model, and each of the first application and the second application can be configured to:

access the given data item to identify the physical metadata of that given data item; identify, in the metadata model, the child node presenting the identified physical metadata of the given data item; traverse one or more edges in the metadata model to identify the one or more parent nodes of the identified child node; determine, from the logical metadata associated with the one or more parent nodes identified, at least one operation to be performed on the given data item; apply the at least one operation to the given data item to transform the given data item; and store the transformed data item.

Implementations of the subject matter and the operations described in this specification, including the data ingestion system and components thereof, can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs (also referred to as a data processing program) (i.e., one or more modules of computer program instructions, encoded on computer storage medium for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The subject matter may be implemented on computer program instructions stored on a non-transitory computer storage medium.

The operations described in this specification can be implemented as operations performed by a data processing system or apparatus on data stored on one or more computer-readable storage devices or received from other sources. The term "data processing system" encompasses all kinds of apparatus, devices, and machines for processing data including, by way of example: a programmable processor, a computer, a system on a chip, or multiple ones, or combinations, of the foregoing. The system can include special purpose logic circuitry (e.g., an FPGA (field programmable gate array) or an ASIC (application specific integrated circuit)). The system can also include, in addition to hardware, code that provides an execution environment for the computer program in question (e.g., code that constitutes processor firmware, a protocol stack, a database management system, an operating system, a cross-platform runtime environment, a virtual machine, or a combination of one or more of them). The system and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive)). Devices suitable for storing computer program instructions and data include all forms of non-volatile memory, media and memory devices, including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

Implementations of the subject matter described in this specification can be implemented in a computing system that includes a back end component (e.g., as a data server), or that includes a middleware component (e.g., an application server), or that includes a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network (LAN) and a wide area network (WAN), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any implementations or of what may be claimed, but rather as descriptions of features specific to particular implementations. Certain features that are described in this specification in the context of separate implementations can also be implemented in combination in a single implementation. Conversely, various features that are described in the context of a single embodiment can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Other implementations are within the scope of the following claims.

What is claimed is:

1. A method implemented by a metadata management system for using a metadata model to identify which one or more operations to execute in processing one or more data items, with the metadata model including one or more parent nodes and one or more child nodes, with the one or more operations being defined with respect to one or more parent nodes in the metadata model and applied to data represented by one or more child nodes in the metadata model, with the one or more parent nodes specifying logical metadata and with the one or more child nodes specifying physical metadata representing the one or more data items, the method including:

accessing, from memory by one or more processors, a given data item and physical metadata of that given data item;

accessing, from memory, a metadata model including nodes and specifying one or more relationships among at least two of the nodes;

accessing, from memory by one or more processors, a child node of the metadata model, the child node associated with the physical metadata of the given data item;

based on the one or more relationships, accessing, from memory by one or more processors, one or more parent nodes of the child node, with the one or more parent nodes specifying logical metadata including information relating to the physical metadata of the child node;

accessing, from memory by one or more processors and from the logical metadata including the information relating to the physical metadata of the child node and associated with the one or more parent nodes identified, data specifying one or more operations to be performed on the given data item; and storing, in memory, a transformed data item generated by applying the one or more operations specified by the data to one or more values of a field of the given data item or to one or more fields of the given data item to transform the given data item, wherein the transformed data item is accessible for retrieval.

2. The method of claim 1, further including identifying the child node representing the physical metadata of the given data item by matching the physical metadata of the given data item to physical metadata represented by the child node in the metadata model.

3. The method of claim 1, further including accessing one or more metadata transforms to determine the one or more operations to be performed on the given data item, each metadata transform specifying at least one operation to be performed on data and at least one condition for performing the at least one operation.

4. The method of claim 3, further including determining the one or more operations to be performed on the given data item by:

selecting a metadata transform from the one or more metadata transforms;

determining whether the logical metadata associated with the one or more parent nodes satisfies the at least one condition of the selected metadata transform; and in response to determining that the logical metadata associated with the one or more parent nodes satisfies the at least one condition of the selected metadata transform, determining that the one or more operations to be performed on the given data item includes the at least one operation specified by the selected metadata transform.

5. The method of claim 1, further including identifying the given data item by identifying the given data item that is accessed according to a processing specification, and further including applying the one or more operations to the given data item by:

inserting the data specifying the one or more operations into the processing specification; and executing the processing specification to apply the one or more operations to the given data item.

6. The method of claim 5, wherein the processing specification includes a specification for a dataflow graph, and wherein the applying the one or more operations to the given data item includes executing the dataflow graph, with the executing dataflow graph applying the one or more operations to the given data item.

7. The method of claim 1, further including updating the metadata model based on the transformed data item.

8. The method of claim 7, wherein updating the metadata model includes adding one or more edges to existing nodes in the metadata model to connect the existing nodes in the metadata model to added nodes.

9. The method of claim 7, further including:

identifying physical metadata of the transformed data item;

identifying, in the updated metadata model, a child node representing the physical metadata of the transformed data item;

traversing one or more edges in the updated metadata model to identify one or more parent nodes of the child node that represents the physical metadata of the transformed data item; and determining, from logical metadata associated with the one or more parent nodes identified by traversing the one or more edges in the updated metadata model, that the one or more operations performed on the given data item are not to be performed on the transformed data item.

10. The method of claim 9, further including determining that the one or more operations performed on the given data item are not to be performed on the transformed data item includes determining that the logical metadata associated with the one or more parent nodes identified by traversing the one or more edges in the updated metadata model is different from the logical metadata associated with the one or more parent nodes identified by traversing the one or more edges in the metadata model.

11. The method of claim 7, wherein updating the metadata model includes adding one or more nodes to the metadata model, the added one or more nodes representing metadata for the transformed data item.

12. The method of claim 11, wherein some of the added one or more nodes are replications of some of the nodes that were already existing in the metadata model before the updating.

13. The method of claim 12, further including outputting the updated metadata model for further processing of a data item.

14. The method of claim 12, further including:
identifying physical metadata of the transformed data item;
identifying, in the updated metadata model, a child node representing the physical metadata of the transformed data item;
traversing one or more edges in the updated metadata model to identify one or more parent nodes of the child node that represents the physical metadata of the transformed data item;
determining, from logical metadata associated with the one or more parent nodes identified by traversing the one or more edges in the updated metadata model, one or more second operations to be performed on the transformed data item;
applying, by the metadata management system, the one or more second operations to the transformed data item to further transform the transformed data item; and
storing, in memory, the further transformed data item.

15. The method of claim 1, further including applying the one or more operations to the given data item by dropping a data field associated with the data item from further processing by a computer program.

16. The method of claim 1, further including applying the one or more operations to the given data item by adding a data field to the data item or a dataset associated with the data item.

17. The method of claim 1, further including applying the one or more operations to the given data item by filtering a data record associated with the data item.

18. The method of claim 1, wherein the one or more operations to be performed on the given data item include a tokenization operation, and wherein the method further includes applying the tokenization operation to the given data item to tokenize one or more fields of the given data item.

19. The method of claim 1, wherein the logical metadata associated with the one or more parent nodes includes metadata received from a user by interaction with the metadata management system.

20. The method of claim 19, wherein the metadata received from the user is a personally identifiable information (PII) specification that was specified by the user through a graphical user interface, said graphical user interface including a visualization of the metadata model, and wherein the PII specification was specified by an interaction of the user with the visualization of the metadata model to select an item of metadata associated with one or more of the parent nodes for which the PII specification is to be specified in the model, and the method further including:
updating the metadata model after receiving the PII specification to associate the logical metadata with the one or more parent nodes, including indicating in the metadata model that the one or more of the parent nodes associated with the selected item of metadata are associated with the PII specification, wherein the one or more operations applied to the given data item to transform the given data item includes tokenizing one or more fields of the given data item.

21. The method of claim 1, further including:
accessing a plurality of data items stored in hardware storage;
for each data item of the plurality of data items, identifying physical metadata and logical metadata corresponding to the data item;
generating the metadata model based on the physical metadata and the logical metadata identified for each of the plurality of data items;
providing access to the metadata model for a first application and a second application;
accessing, by at least one of the first application or the second application, the metadata model, wherein each of the first application and the second application are configured to:
access the given data item to identify the physical metadata of that given data item;
identify, in the metadata model, the child node presenting the identified physical metadata of the given data item;
traverse one or more edges in the metadata model to identify the one or more parent nodes of the identified child node;
determine, from the logical metadata associated with the one or more parent nodes identified, at least one operation to be performed on the given data item;
apply the at least one operation to the given data item to transform the given data item; and
store the transformed data item.

22. The method of claim 1, wherein the metadata model includes a first data structure corresponding to the parent nodes, the data structure including the logical metadata and at least a first pointer and a second pointer, wherein the first pointer points to a second data structure corresponding to the child node that represents the physical metadata of the given data item, and the second pointer points to a third data structure corresponding to another child node that represents physical metadata of another data item different from the given data item.

23. The method of claim 1, further including:
causing rendering of one or more visualizations of the transformed data item on a display of a display device.

24. A system including:
at least one processor; and
memory storing instructions executable by the at least one processor to perform operations including:
accessing, from memory, a given data item and physical metadata of that given data item;
accessing, from memory, a metadata model including nodes and specifying one or more relationships among at least two of the nodes;

accessing, from memory, a child node of the metadata model, the child node associated with the physical metadata of the given data item;

based on the one or more relationships, accessing, from memory, one or more parent nodes of the child node, with the one or more parent nodes specifying logical metadata including information relating to the physical metadata of the child node;

accessing, from memory and from the logical metadata including the information relating to the physical metadata of the child node and associated with the one or more parent nodes identified, data specifying one or more operations to be performed on the given data item; and storing, in memory, a transformed data item generated by applying the one or more operations specified by the data to one or more values of a field of the given data item or to one or more fields of the given data item to transform the given data item, wherein the transformed data item is accessible for retrieval.

25. The system of claim 24, wherein the operations further include accessing one or more metadata transforms to determine the one or more operations to be performed on the given data item, each metadata transform specifying at least one operation to be performed on data and at least one condition for performing the at least one operation.

26. The system of claim 24, wherein the operations further include updating the metadata model based on the transformed data item.

27. The system of claim 26, wherein updating the metadata model includes adding one or more nodes to the metadata model, the added one or more nodes representing metadata for the transformed data item.

28. The system of claim 24, wherein the one or more operations to be performed on the given data item include a tokenization operation, and wherein the operations further include applying the tokenization operation to the given data item to tokenize one or more fields of the given data item.

29. The system of claim 24, wherein the logical metadata associated with the one or more parent nodes includes metadata received from a user by interaction with the metadata management system.

30. A non-transitory computer readable medium storing instructions executable by at least one processor to perform operations including:

accessing, from memory, a given data item and physical metadata of that given data item;

accessing, from memory, a metadata model including nodes and specifying one or more relationships among at least two of the nodes;

accessing, from memory, a child node of the metadata model, the child node associated with the physical metadata of the given data item;

based on the one or more relationships, accessing, from memory, one or more parent nodes of the child node, with the one or more parent nodes specifying logical metadata including information relating to the physical metadata of the child node;

accessing, from memory and from the logical metadata including the information relating to the physical metadata of the child node and associated with the one or more parent nodes identified, data specifying one or more operations to be performed on the given data item; and storing, in memory, a transformed data item generated by applying the one or more operations specified by the data to one or more values of a field of the given data item or to one or more fields of the given data item to transform the given data item, wherein the transformed data item is accessible for retrieval.

31. The non-transitory computer readable medium of claim 30, wherein the operations further include accessing one or more metadata transforms to determine the one or more operations to be performed on the given data item, each metadata transform specifying at least one operation to be performed on data and at least one condition for performing the at least one operation.

32. The non-transitory computer readable medium of claim 30, wherein the operations further include updating the metadata model based on the transformed data item.

33. The non-transitory computer readable medium of claim 32, wherein updating the metadata model includes adding one or more nodes to the metadata model, the added one or more nodes representing metadata for the transformed data item.

34. The non-transitory computer readable medium of claim 30, wherein the one or more operations to be performed on the given data item include a tokenization operation, and wherein the operations further include applying the tokenization operation to the given data item to tokenize one or more fields of the given data item.

35. The non-transitory computer readable medium of claim 30, wherein the logical metadata associated with the one or more parent nodes includes metadata received from a user by interaction with the metadata management system.

* * * * *